US012684372B2

(12) United States Patent
Parichehrehteroujeni et al.

(10) Patent No.: US 12,684,372 B2
(45) Date of Patent: Jul. 14, 2026

(54) NETWORK NODES AND METHODS FOR HANDLING A SERVICE IN A WIRELESS COMMUNICATION NETWORK

(71) Applicant: Telefonaktiebolaget LM Ericsson (publ), Stockholm (SE)

(72) Inventors: Ali Parichehrehteroujeni, Linköping (SE); Luca Lunardi, Genoa (IT); Cecilia Eklöf, Täby (SE); Johan Rune, Lidingö (SE); Angelo Centonza, Granada (ES); Filip Barac, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 421 days.

(21) Appl. No.: 18/255,957

(22) PCT Filed: Dec. 7, 2021

(86) PCT No.: PCT/SE2021/051211
§ 371 (c)(1),
(2) Date: Jun. 5, 2023

(87) PCT Pub. No.: WO2022/124965
PCT Pub. Date: Jun. 16, 2022

(65) Prior Publication Data
US 2024/0031832 A1 Jan. 25, 2024

Related U.S. Application Data

(60) Provisional application No. 63/122,050, filed on Dec. 7, 2020.

(51) Int. Cl.
*H04W 24/02* (2009.01)

(52) U.S. Cl.
CPC ................................... *H04W 24/02* (2013.01)

(58) Field of Classification Search
CPC ...... H04W 24/02; H04W 24/08; H04W 24/10
See application file for complete search history.

(56) References Cited

U.S. PATENT DOCUMENTS

| | | | |
|---|---|---|---|
| 9,380,476 B2 | 6/2016 | Vanderna et al. | |
| 2021/0377773 A1* | 12/2021 | Hu ........................ | H04L 5/0091 |
| 2023/0156767 A1* | 5/2023 | Hu ........................ | H04W 24/10 |
| | | | 370/329 |

FOREIGN PATENT DOCUMENTS

| | | | |
|---|---|---|---|
| WO | 2018098790 A1 | 6/2018 | |
| WO | 2019088905 A1 | 5/2019 | |
| (Continued) | | | |

OTHER PUBLICATIONS

Japanese Office Action and English summary dated Jun. 18, 2024 for Application No. 2023-534287, consisting of 17 pages.

(Continued)

*Primary Examiner* — Chuong A Ngo
(74) *Attorney, Agent, or Firm* — Weisberg I.P. Law, P.A.

(57) ABSTRACT

A first network node and method therein for handling one or more services in a wireless communication network are disclosed. The first network node is configured to receive from a second network node an indication relating to application layer measurement configurations for one or more services for one or more wireless communication devices, determine a set of application layer measurement configurations for one or more wireless communication devices based on the received indication relating to application layer measurement configurations, and send the determined set of application layer measurement configurations or an indication of the determined set of application layer measurement configurations to the one or more wireless communication devices.

20 Claims, 16 Drawing Sheets

(56) References Cited

FOREIGN PATENT DOCUMENTS

| WO | 2020128657 A1 | 6/2020 |
|----|---------------|--------|
| WO | 2020162811 A1 | 8/2020 |
| WO | 2020222172 A1 | 11/2020 |
| WO | 2022075903 A1 | 4/2022 |
| WO | 2022081063 A1 | 4/2022 |
| WO | 2022083558 A1 | 4/2022 |
| WO | 2022084926 A1 | 4/2022 |

OTHER PUBLICATIONS

3GPP TSG-RAN WG3 Meeting #110-e R3-206399; Title: pCR for TR 38.890: Way Forward on Remaining Issues in NR QoE Management; Agenda Item: 15.2; Source: Ericsson; Document for: Agreement; Location and Date: Online, Nov. 2-12, 2020, consisting of 13 pages.

Ericsson, "QoE Measurement Collection in NR", R2-1906232, 3GPP TSG RAN WG2 #106, Reno, US, May 13-17, 2019.

International Search Report and Written Opinion dated Feb. 1, 2022 for International Application No. PCT/SE2021/051211 filed Dec. 7, 2021, consisting of 12-pages.

3GPP TS 26.114 V16.6.0; 3rd Generation Partnership Project; Technical Specification Group Services and System Aspects; IP Multimedia Subsystem (IMS); Multimedia Telephony; Media handling and interaction (Release 16); Jun. 2020, consisting of 446-pages.

3GPP TS 26.247 V16.4.0; 3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16); Sep. 2020, consisting of 140-pages.

3GPP TSG RAN2 Meeting #110 R2-2004624; Title: QoE measurement collection additions; Source to WG: Ericsson; Source to TSG: R2; Work Item Code: LTE_QMC_streaming, TEI16; Date and Location: Jun. 1-12, 2020, Electronic meeting, consisting of 80-pages.

3GPP TSG-Ran WG2 Meeting #112-e R2-2010476; Title: Discussion on QoE in NR; Agenda Item: 8.14; Source: ZTE Corporation, Sanechips; Document for: Discussion and Decision; Date and Location: Nov. 2-13, 2020, Electronic meeting, consisting of 7-pages.

3GPP TSG-RAN3 Meeting #109-e R3-205402; Title: Discussion on NR QoE requirements and potential solutions; Agenda Item: 15.2; Source: Samsung; Document for: Discussion & Approval; Date and Location: Aug. 17-28, 2020, Electronic meeting, consisting of 5-pages.

3GPP TSG-RAN3 Meeting #109-e R3-205403; Title: Discussion on NR QoE interface impact and solutions; Agenda Item: 15.2; Source: Samsung; Document for: Discussion & Approval; Date and Location: Aug. 17-28, 2020, Electronic meeting, consisting of 5-pages.

3GPP TSG-RAN3 Meeting #110-e R3-206036; Title: Discussion on NR QoE solutions; Agenda Item: 15.2; Source: Samsung; Document for: Discussion & Approval; Date and Location: Nov. 2-12, 2020, Electronic meeting, consisting of 6-pages.

3GPP TS 28.405 V16.0.0; 3rd Generation Partnership Project; Technical Specification Group Services and System Aspects; Telecommunication management; Quality of Experience (QoE) measurement collection; Control and configuration (Release 16); Jul. 2020, consisting of 16-pages.

3GPP TS 38.413 V16.3.0; 3rd Generation Partnership Project; Technical Specification Group Radio Access Network; NG-RAN; NG Application Protocol (NGAP) (Release 16); Sep. 2020, consisting of 411-pages.

3GPP TS 36.423 V16.3.0; 3rd Generation Partnership Project; Technical Specification Group Radio Access Network; Evolved Universal Terrestrial Radio Access Network (E-UTRAN); X2 application protocol (X2AP) (Release 16); Sep. 2020, consisting of 496-pages.

3GPP TS 36.413 V16.3.0; 3rd Generation Partnership Project; Technical Specification Group Radio Access Network; Evolved Universal Terrestrial Radio Access Network (E-UTRAN); S1 Application Protocol (S1AP) (Release 16); Sep. 2020, consisting of 422-pages.

3GPP TS 36.331 V16.0.0; 3rd Generation Partnership Project; Technical Specification Group Radio Access Network; Evolved Universal Terrestrial Radio Access (E-UTRA); Radio Resource Control (RRC); Protocol specification (Release 16); Mar. 2020, consisting of 1048-pages.

* cited by examiner

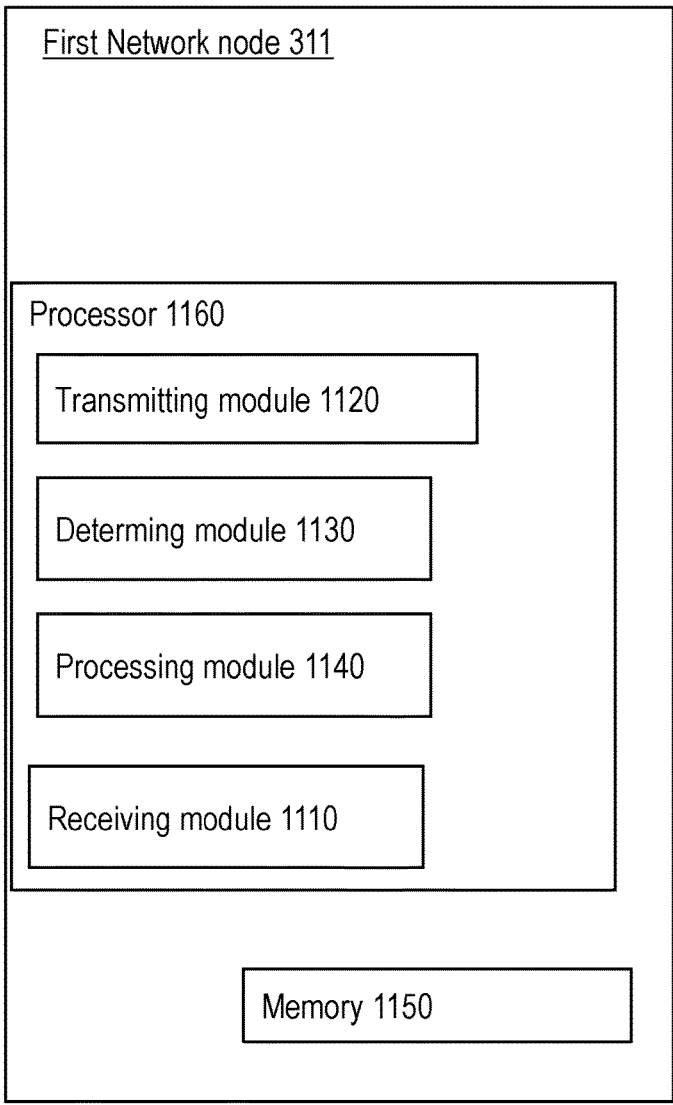
First Network node 311
Processor 1160
Transmitting module 1120
Determing module 1130
Processing module 1140
Receiving module 1110
Memory 1150
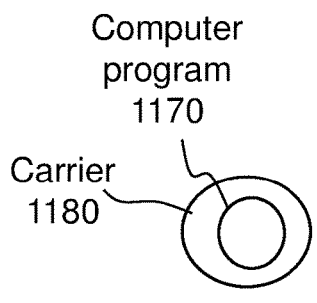
Computer program 1170
Carrier 1180
Fig. 11
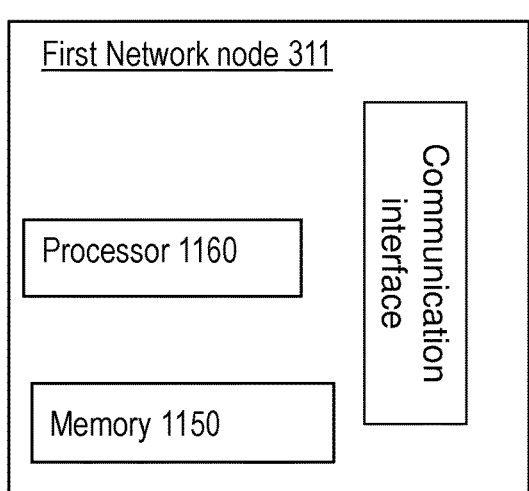
First Network node 311
Processor 1160
Memory 1150
Communication interface

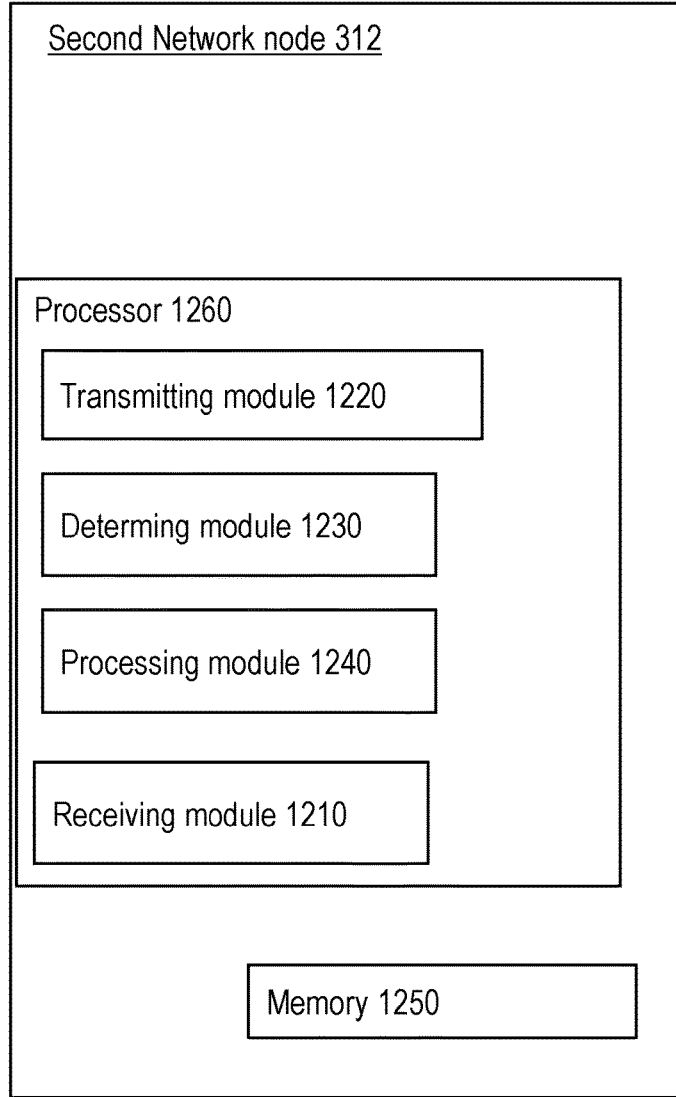
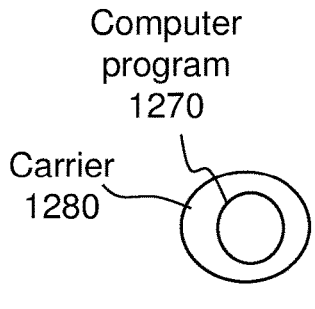
Fig. 12
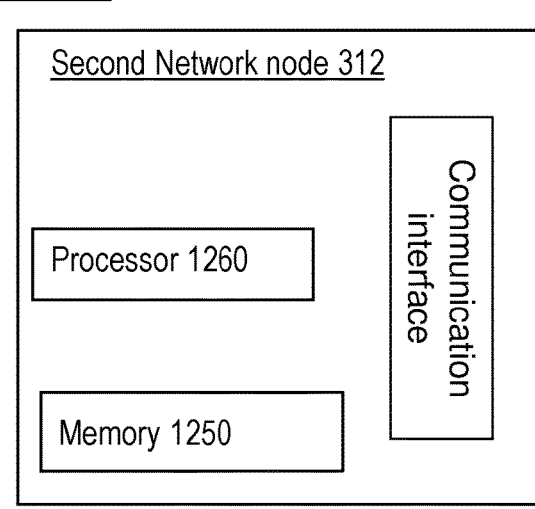

NETWORK NODES AND METHODS FOR HANDLING A SERVICE IN A WIRELESS COMMUNICATION NETWORK

CROSS-REFERENCE TO RELATED APPLICATIONS

This application is a Submission Under 35 U.S.C. § 371 for U.S. National Stage Patent Application of International Application No.: PCT/SE2021/051211, filed Dec. 7, 2021 entitled "NETWORK NODES AND METHODS FOR HANDLING A SERVICE IN A WIRELESS COMMUNICATION NETWORK," which claims priority to U.S. Provisional Application No. 63/122,050, filed Dec. 7, 2020, the entireties of both of which are incorporated herein by reference.

TECHNICAL FIELD

Embodiments herein relate to network nodes and methods therein. Furthermore, a computer program and a computer readable storage medium are also provided herein. In particular, embodiments herein relate to handling one or more services for one or more UEs.

BACKGROUND

In a typical wireless communication network, wireless devices, also known as wireless communication devices, mobile stations, stations (STA) and/or user equipment (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB" or "gNB". A service area or cell area is a geographical area where radio coverage is provided by the radio network node. The radio network node communicates over an air interface operating on radio frequencies with the wireless device within a range of the radio network node.

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE) have been completed within the 3rd Generation Partnership Project (3GPP) and this work continues in the coming 3GPP releases, for example to specify a Fifth Generation (5G) New Radio (NR) network and upcoming releases.

Quality of Experience (QoE) measurements have been specified for LTE and UMTS. The purpose of the application layer measurements is to measure the end user experience when using certain applications. Currently QoE measurements for streaming services and for Mobility Telephony Service for IP Multimedia Subsystem (IMS) (MTSI) services are supported.

The solutions in LTE and UMTS are similar with the overall principles as follows. Quality of Experience Measurement Collection enables configuration of application layer measurements in the UE and transmission of QoE measurement result files by means of radio resource control (RRC) signalling. The RAN receives an application layer measurement configuration from Operation and Maintenance (OAM) or CN encapsulated in a transparent container, which the RAN forwards to a UE in a downlink RRC message. Similarly, the "modem", or Access Stratum, part of the UE, e.g. the RRC layer or entity, receives application layer measurement results from UE's higher layer, e.g. the application layer, encapsulated in a transparent container and sends it to the network in an uplink RRC message. The RAN in turn forwards the result container to a Trace Collection Entity (TCE) or Measurement Collection Entity (MCE).

In 3GPP release 17 a new study item "Study on NR QoE management and optimizations for diverse services" for NR has been approved. The purpose of the study item is to study solutions for QoE measurements in NR. QoE management in NR will not just collect the experience parameters of streaming services but also consider the typical performance requirements of diverse services, e.g. Augmented Reality/ Virtual Reality (AR/VR) and Ultra Reliable Low-Latency Communications (URLLC). Based on requirements of services, the NR study will also include more adaptive QoE management schemes that enable the network to perform intelligent optimizations to satisfy user experience for diverse services.

The measurements may be initiated towards RAN in management-based manner, i.e. from an OAM node in a generic, i.e. not UE specific way, e.g. for a group of UEs, for QoE measurements in a certain area and/or for a certain service, or they may also be initiated in a signaling-based manner, i.e. initiated from CN to RAN, in which case the configuration conveyed from the CN points out one or more specific UEs to be configured for the QoE measurements, e.g. a single UE. The configuration of the measurement includes the measurement details, which is encapsulated in a container that is transparent to RAN, as well as to the lower layers in the UE, i.e. the "modem" or Access Stratum part of the UE, but interpretable by the application layer in the UE.

When initiated via the core network, the measurement is started towards a specific UE. For the LTE case, the "TRACE START" S1AP message is used, which carries, among others, the details about the measurement configuration the application should collect, in the "Container for application layer measurement configuration" Information Element (IE), transparent to the RAN, and the details to reach the trace collection entity to which the measurements should be sent.

The RAN is not aware of when a streaming session is ongoing and the UE Access Stratum is also not aware of when the measurements are ongoing. It is an implementation decision when the RAN stops the measurements. Typically, it is done when the UE has moved outside the configured measurement area.

One opportunity provided by legacy solution is also to be able to keep the QoE measurement for the whole application session, even during handover situation.

QoE Measurement in Evolved Universal Terrestrial Radio Access (E-UTRAN)

E-UTRAN—Application layer measurement capabilities:

For E-UTRAN, the UE capability transfer is used to transfer UE radio access capability information from the UE to E-UTRAN. FIG. 1 shows a signaling chart for UE capability transfer in E-UTRAN.

The UE-EUTRA-Capability IE is used to convey the E-UTRA UE Radio Access Capability Parameters and the Feature Group Indicators for mandatory features to the network.

In the response message "UECapabilityInformation", the UE can include the "UE-EUTRA-Capability" IE. The "UE-EUTRA-Capability" IE may include the UE-EUTRA-Capability-v1530-IE which can be used by the UE to indicate whether the UE supports or not QoE Measurement Collection for streaming services and/or MTSI services, as detailed in the "MeasParameters-v1530" encoding below.

The contribution CR 4297 (R2-2004624) for 3GPP TS 36.331 v16.0.0 at the 3GPP TSG RAN2 Meeting #110 proposed an extension of the "UE-EUTRA-Capability" IE that, within the "UE-EUTRA-Capability-v16xy-IE" may include a "measParameters-v16xy" comprising the qoe-Extensions-r16 IE. The qoe-Extensions-r16 IE may be used to indicate whether the UE supports the release 16 extensions for QoE Measurement Collection, i.e. if the UE supports more than one QoE measurement type at a time and if the UE supports the signaling of withinArea, sessionRecordingIndication, doe-Reference, temporaryStopQoE and restartQoE.

A UE capable of application layer measurement reporting in RRC_CONNECTED may initiate the procedure when configured with application layer measurement, i.e. when measConfigAppLayer has been configured by E-UTRAN.

Upon initiating the procedure, the UE shall:
1> if configured with application layer measurement, and SRB4 is configured, and the UE has received application layer measurement report information from upper layers:
2> set the measReportAppLayerContainer in the MeasReportAppLayer message to the value of the application layer measurement report information;
2> set the serviceType in the MeasReportAppLayer message to the type of the application layer measurement report information;
2> submit the MeasReportAppLayer message to lower layers for transmission via SRB4.

E-UTRAN—QoE measurement configuration setup and release—RRC signaling:

```
MeasParameters-v1530 encoding:
MeasParameters-v1530 ::=              SEQUENCE {
    qoe-MeasReport-r15              ENUMERATED {supported}    OPTIONAL,
    qoe-MTSI-MeasReport-r15          ENUMERATED {supported}
    OPTIONAL,
    ca-IdleModeMeasurements-r15    ENUMERATED {supported}    OPTIONAL,
    ca-IdleModeValidityArea-r15    ENUMERATED {supported}    OPTIONAL,
    heightMeas-r15                 ENUMERATED {supported}    OPTIONAL,
    multipleCellsMeasExtension-r15   ENUMERATED {supported}  OPTIONAL
}
MeasParameters-v16xy ::=              SEQUENCE {
    qoe-Extensions-r16               ENUMERATED {supported}
    OPTIONAL
}
``` qoe-MeasReport: Indicates whether the UE supports QoE Measurement Collection for streaming services.

qoe-MTSI-MeasReport: Indicates whether the UE supports QoE Measurement Collection for MTSI services.

doe-Extensions: Indicates whether the UE supports the release 16 extensions for QoE Measurement Collection, i.e. support of more than one QoE measurement type at a time and signalling of withinArea, sessionRecordingIndication, doe-Reference, temporaryStopQoE and restartQoE.

temporaryStopQoE: Indicates that reporting, but not collection, of QoE measurements shall be temporarily stopped.

withinArea: The field indicates at handover, for each application layer measurement, whether the new cell is inside the area for the measurement, i.e. whether the UE is allowed to start new measurements in the cell.

restartQoE: Indicates that QoE measurements can be reported again after a temporary stop.

The QoE-Reference contains the parameter QoE Reference as defined in 3GPP TS 28.405.

```
-- ASN1START
QoE-Reference-r16 ::=     SEQUENCE {
    plmn-Identity-r16         PLMN-Identity,
    qmc-Id-r16                OCTET STRING (SIZE (3))
}
-- ASN1STOP
```

E-UTRAN—Application layer measurement reporting:

The purpose of the "Application layer measurement reporting" procedure described in 3GPP TS 36.331 and shown in FIG. 2 is to inform E-UTRAN about application layer measurement report.

The RRCConnectionReconfiguration message is used to reconfigure the UE to setup or release the UE for Application Layer measurements. This is signaled in the measConfigAppLayer-15 IE within the "OtherConfig" IE.

The setup includes the transparent container measConfigAppLayerContainer which specifies the QoE measurement configuration for the Application of interest and the serviceType IE to indicates the Application or service for which the QoE measurements are being configured. Supported services are streaming and MTSI.

The contribution CR 4297 (R2-2004624) for 3GPP TS 36.331 v16.0.0 at the 3GPP TSG RAN2 Meeting #110 proposed to extend the QoE measurement configuration.

The measConfigAppLayerToAddModList-r16 may be used to add or modify multiple QoE measurement configurations up to maxQoE-Measurement-r16. The measConfigAppLayerToReleaseList-r16 IE may be used to remove multiple QoE measurement configuration up to maxQoE-Measurement-r16.

Below is the details of the OtherConfig IE related to measConfigAppLayer-r15, measConfigAppLayerToAddModList-r16 and measConfigAppLayerToReleaseList-r16.

```
measConfigAppLayer-r15                      CHOICE {
  release                                   NULL,
  setup                                       SEQUENCE{
  measConfigAppLayerContainer-r15               OCTET STRING (SIZE(1..1000)),
  serviceType-r15                                     ENUMERATED {qoe, qoemtsi, spare6,
      spare5, spare4, spare3, spare2, spare1}
}
  measConfigAppLayerToAddModList-r16                          SEQUENCE
  (SIZE (1.. maxQoE-Measurement-r16)) OF            MeasConfig AppLayer-r16
  OPTIONAL,                                 -- Need ON
measConfigAppLayerToReleaseList-r16                          SEQUENCE
  (SIZE (1.. maxQoE-Measurement-r16)) OF            MeasRelease AppLayer-r16
  OPTIONAL                                  -- Need ON
MeasConfigAppLayer-r16 ::= SEQUENCE {
  measConfigAppLayerContainer-r15                   OCTET STRING (SIZE(1..1000))
  OPTIONAL,                                 -- Need ON
  serviceType-r16                           Service Type-r16    OPTIONAL, -- Need ON
  qoe-Reference-r16                         QoE-Reference-r16   OPTIONAL, -- Need ON
  withinArea-r16 ENUMERATED {inside, outside}           OPTIONAL, -- Need ON
  temporaryStopQoE-r16                            BOOLEAN,
  restartQoE-r16                                  BOOLEAN
}
MeasReleaseAppLayer-r16 ::= SEQUENCE {
  service Type-r16                          ServiceType-r16     OPTIONAL, -- Need ON
  qoe-Reference-r16                         QoE-Reference-r16   OPTIONAL -- Need ON
}
``` measConfigAppLayerContainer
The field contains configuration of application layer measurements, see Annex L (normative) in
TS 26.247 and clause 16.5 in TS 26.114.
serviceType
Indicates the type of application layer measurement. Value qoe indicates Quality of Experience
Measurement Collection for streaming services, value qoemtsi indicates Enhanced Quality of
Experience Measurement Collection for MTSI.
measConfigAppLayerToAddModList
The field is used to setup or modify application layer measurements, see Annex L
(normative) in TS
26.247 and clause 16.5 in TS 26.114.
measConfigAppLayerToReleaseList
The field is used to release application layer measurements, see Annex L (normative) in TS
26.247 and clause 16.5 in TS 26.114.

The ServiceType contains the service type of a certain QoE
measurement as defined in TS 28.405:

```
-- ASN1START
ServiceType-r16 ::= ENUMERATED {qoe, qoemtsi, spare6, spare5, spare4,
    spare3, spare2, spare1}
-- ASN1STOP
``` maxQoE-Measurement-r16     INTEGER::=8—Maximum number of QoE Measurements

For E-UTRAN, an example of desired UE behavior at reception of the "OtherConfig" IE in the RRCReconfiguration message is described in CR 4297 (R2-2004624):

1> if the received otherConfig includes the measConfigAppLayerToAddModList:

2> for each serviceType and doe-Reference included in the measConfigAppLayerToAddModList:

2> forward measConfigAppLayerContainer, doe-Reference and serviceType to upper layers considering the serviceType;

2> consider itself to be configured to send application layer measurement report in accordance with 5.6.19;

2> forward withinArea to upper layers if received;

2> forward temporaryStopQoE to upper layers if received;

2> forward restartQoE to upper layers if received;

1> if the received otherConfig includes the measConfigAppLayerToReleaseList:

2> for each serviceType and doe-Reference included in the measConfigAppLayerToReleaseList:

2> inform upper layers to clear the associated stored application layer measurement configuration;

2> discard received associated application layer measurement report information from upper layers;

2> consider itself not to be configured to send the associated application layer measurement report for that serviceType and doe-Reference.

E-UTRAN—QoE measurement reporting—RRC signaling:

As specified in 3GPP TS 36.331, the MeasReportApplayer RRC message is used by the UE to send to the E-UTRAN node the QoE measurement results of an Application or service. The service for which the report is being sent is indicated in the "serviceType" IE.

The contribution CR 4297 (R2-2004624) for 3GPP TS 36.331 v16.0.0 at the 3GPP TSG RAN2 Meeting #110 proposed to extend the MeasReportAppLayer IEs introducing a QoE reference comprising the PLMN identity and the identifier of the QoE Measurement Collection.

Below is the details for the MeasReportAppLayer message, sent using Signalling Radio Bearer, SRB4.

2> set the serviceType in the MeasReportAppLayer message to the type of the application layer measurement report information;

2> set the doe-Reference in the MeasReportAppLayer message to the value received from upper layer;

2> set the recordingSessionIndication in the MeasReportAppLayer message to the value received from upper layer;

---

MeasReportAppLayer message

```
-- ASN1START
MeasReportAppLayer-r15 ::=                       SEQUENCE {
    criticalExtensions                           CHOICE {
        measReportAppLayer-r15                       MeasReportAppLayer-r15-IEs,
        criticalExtensionsFuture                     SEQUENCE { }
    }
}
MeasReportAppLayer-r15-IEs ::=                   SEQUENCE {
    measReportAppLayerContainer-r15              OCTET STRING (SIZE(1..8000))
        OPTIONAL,
    serviceType-r15                              ENUMERATED
        {qoe, qoemtsi,spare6, spare5, spare4, spare3, spare2, spare1}
        OPTIONAL,
    nonCriticalExtension            MeasReportAppLayer-v1590-IEs OPTIONAL
}
MeasReportAppLayer-v1590-IEs ::=                 SEQUENCE {
    lateNonCriticalExtension        OCTET STRING       OPTIONAL,
    nonCriticalExtension            MeasReportAppLayer-IEs-v16xy
OPTIONAL
}
MeasReportAppLayer-IEs-v16xy ::= SEQUENCE {
    qoe-Reference-r16           QoE-Reference-r16       OPTIONAL, -- Need ON
    recordingSessionIndication-r16      OOLEAN          OPTIONAL, -- Need ON
    nonCriticalExtension        SEQUENCE { }            OPTIONAL
}
-- ASN1STOP
```

---

MeasReportAppLayer field descriptions measReportAppLayerContainer
The field contains container of application layer measurements, see Annex L (normative) in TS 26.247 and clause 16.5 in TS 26.114.
serviceType
Indicates the type of application layer measurement. Value qoe indicates Quality of Experience Measurement Collection for streaming services, value qoemtsi indicates Quality of Experience Measurement Collection for MTSI.
qoe-Reference
Contains the reference of the application layer measurement.
recordingSessionIndication
Indicates that a recording of a session in the application layer has started.

---

For E-UTRAN, an example of desired UE behavior for Application layer measurement reporting is described in CR 4297 (R2-2004624):

A UE capable of application layer measurement reporting in RRC_CONNECTED may initiate the procedure when configured with application layer measurement, i.e. when measConfigAppLayer has been configured by E-UTRAN.

Upon initiating the procedure, the UE shall:

1> if configured with application layer measurement, and 60 SRB4 is configured, and the UE has received application layer measurement report information from upper layers:

2> set the measReportAppLayerContainer in the Meas- 65 ReportAppLayer message to the value of the application layer measurement report information;

2> submit the MeasReportAppLayer message to lower layers for transmission via SRB4.

The "UE Application layer measurement configuration" IE is described in 3GPP TS 36.413 v16.3.0 and TS 36.423 v16.3.0.

According to 3GPP TS 28.405, the area scope parameter defines the area in terms of cells or Tracking Area/Routing Area/Location Area where the QMC shall take place. If the parameter is not present the QMC shall be done throughout the PLMN specified in PLMN target.

The area scope parameter in UMTS is either:

List of cells, identified by cell group identifier (CGI). Maximum 32 CGI can be defined.

List of Routing Area, identified by Routing area identifier (RAI). Maximum of 8 RAIs can be defined.

List of Location Area, identified by Location area identifier (LAI). Maximum of 8 LA's can be defined.

The area scope parameter in LTE is either:
list of cells, identified by E-UTRAN-CGI. Maximum 32 CGI can be defined.
List of Tracking Area, identified by tracking area code (TAC). Maximum of 8 TAC can be defined.
The parameter is mandatory if area based QMC is requested.

SUMMARY

The current solution lacks support to configure a network node, such as a RAN node, with multiple QoE measurement configurations.

Therefore it is an object of embodiments herein to provide an improved method to handling application layer measurement configurations, for example, handling multiple Quality of Experience (QoE) measurement configurations in a wireless communication network.

According to embodiments herein the object is achieved by providing a method performed by a first network node for handling one or more services in a wireless communication network. The first network node receives from a second network node an indication relating to application layer measurement configurations for one or more services for one or more UEs. The indication may be a list of application layer measurement configurations, for example, multiple Quality of Experience (QoE) measurement configurations, in the wireless communication network.

According to embodiments herein the object is achieved by providing a method performed by a second network node for handling one or more services in a wireless communication network. The second network node transmits to a first network node an indication relating to application layer measurement configurations for one or more services for one or more UEs. The indication may be a list of application layer measurement configurations.

According to embodiments herein a first network node and a second network node are herein provided to perform the methods above, respectively.

Thus, the first network node, e.g. a RAN node, may receive from the second network node, e.g. an OAM node or a CN node or another RAN node, a list of application layer measurement configurations, e.g. a list of QoE measurement configurations, for the same or different service types.

The current solution further lacks support to configure a RAN node with a multiplicity of Measurement Collection Entities (MCEs) or Trace Collection Entities (TCEs)) towards which application layer measurement reports can be sent. According to embodiments herein the first network node may further receive an indication of a MCE or TCE for a service to which report of the application layer measurement is to be reported. Each UE to be configured may then be provided with some or all of the application layer measurement configurations, e.g. denoted the set of QoE measurement configurations.

The list of application layer measurement configurations may be concurrent or not. The term "concurrent" does not have to mean that the measurements configured by the QoE measurement configurations are performed in parallel. It means that a UE should store all the received QoE measurement configurations and should be prepared to have all or a subset of them active simultaneously. Which of them that are active simultaneously may then depend on which application sessions or media components in an application session that are active simultaneously.

Each application layer measurement configuration may include an indication of whether the configuration concerns a legacy QoE measurement configuration, i.e. with a QMC configuration filed, or a lightweight QoE measurement configuration, for example, a reduced QoE measurement configuration comprising reduced number of parameters to consider when determining QoE. Furthermore, each application layer measurement configuration may include an indication of whether it can be stored and applied or executed in parallel with a legacy QoE measurement configuration in the UE. As yet another option, each application layer measurement configuration may include an indication of whether it can be stored and applied or executed in parallel with a lightweight QoE measurement configuration in the UE. As yet another option, each application layer measurement configuration may include an indication of whether it can be stored and applied or executed in parallel with another application layer measurement configuration (QoE measurement configuration) in the UE, irrespective of the type of the other QoE measurement configuration.

Each application layer measurement configuration including the configuration for quality of experience metrics measurements may include an indication indicating the type of the QoE measurements. The indication indicates if the QoE measurement configuration is a signaling based QoE measurement or a management based QoE or a hybrid version i.e., combination of signaling and management based QoE measurement.

The first network node, e.g. a RAN node, may then forward the QoE measurement configurations to one or more UE(s).

The identified scenarios for which the proposed solution according to embodiments herein may apply are at least the following:
Scenario: "Multiple QoE measurement configurations at Setup". In this scenario, the first network node may be a RAN node and the second network node may be e.g. a RAN node, a 5GC node e.g. AMF, an OAM node, an SMO node.
Scenario: "Multiple QoE measurement configurations at Mobility" e.g. due to handover, cell change or UE context retrieval. In this scenario, the first network node may be a second RAN node and the second network node may be a first RAN node.
Scenario: "Multiple QoE measurement configurations in Multi Connectivity" e.g. in case of SgNB Addition. In this scenario, the first network node may be a first RAN node and the second network node may be a second RAN node.

In addition to methods for provision of multiple QoE measurement configurations in the form of a list of QoE measurement configurations, the embodiments herein also comprise methods supporting independent addition and removal of QoE measurement configuration(s) to and from a set of QoE measurement configuration(s).

The proposed solution according to embodiments herein enables a network operator to run multiple QoE measurement campaigns for different services at the same time.

BRIEF DESCRIPTION OF THE DRAWINGS

Examples of embodiments herein are described in more detail with reference to attached drawings in which.

FIG. 11 is a schematic block diagram illustrating one embodiment of a first network node;

FIG. 12 is a schematic block diagram illustrating one embodiment of a second network node;

DETAILED DESCRIPTION

Please note that the terms "UE", "terminal equipment", "wireless terminal" and "terminal" are used interchangeably.

The terms "QoE measurement report", "QoE report", "measurement report" and "report" are used interchangeably.

The terms "QoE measurement configuration", "QoE measurement", "QoE configuration" and "application layer measurement configuration" are used interchangeably The terms "service" and "application" are used interchangeably.

The terms "MCE" and "TCE" are used interchangeably.

Figure 1:
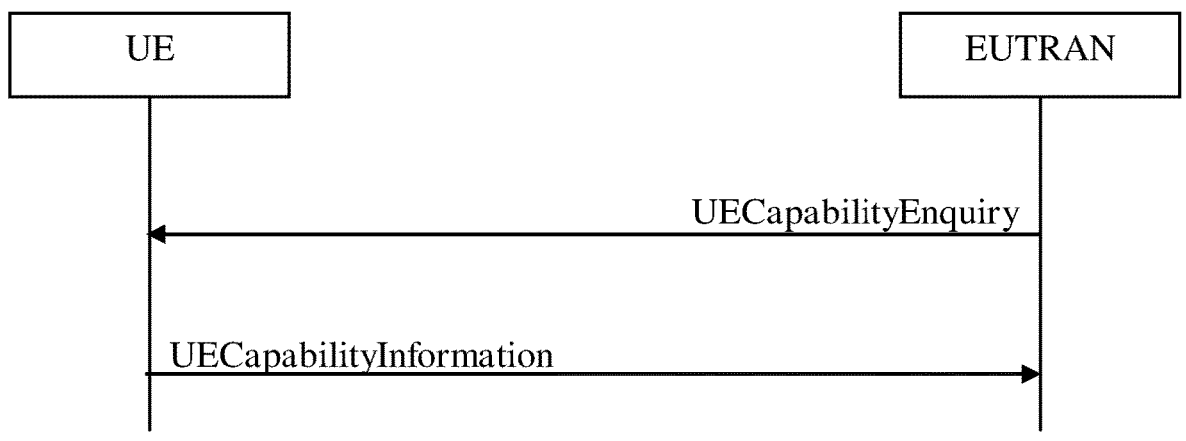
FIG. 1 is a signaling diagram illustrating UE capability transfer in E-UTRAN.
Figure 2:
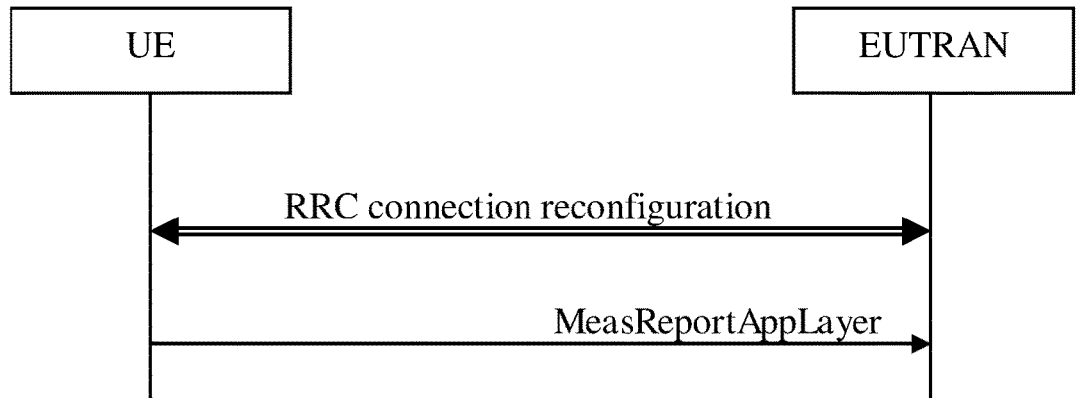
FIG. 2 is a signaling diagram illustrating Application layer measurement reporting in E-UTRAN.
Figure 3A:
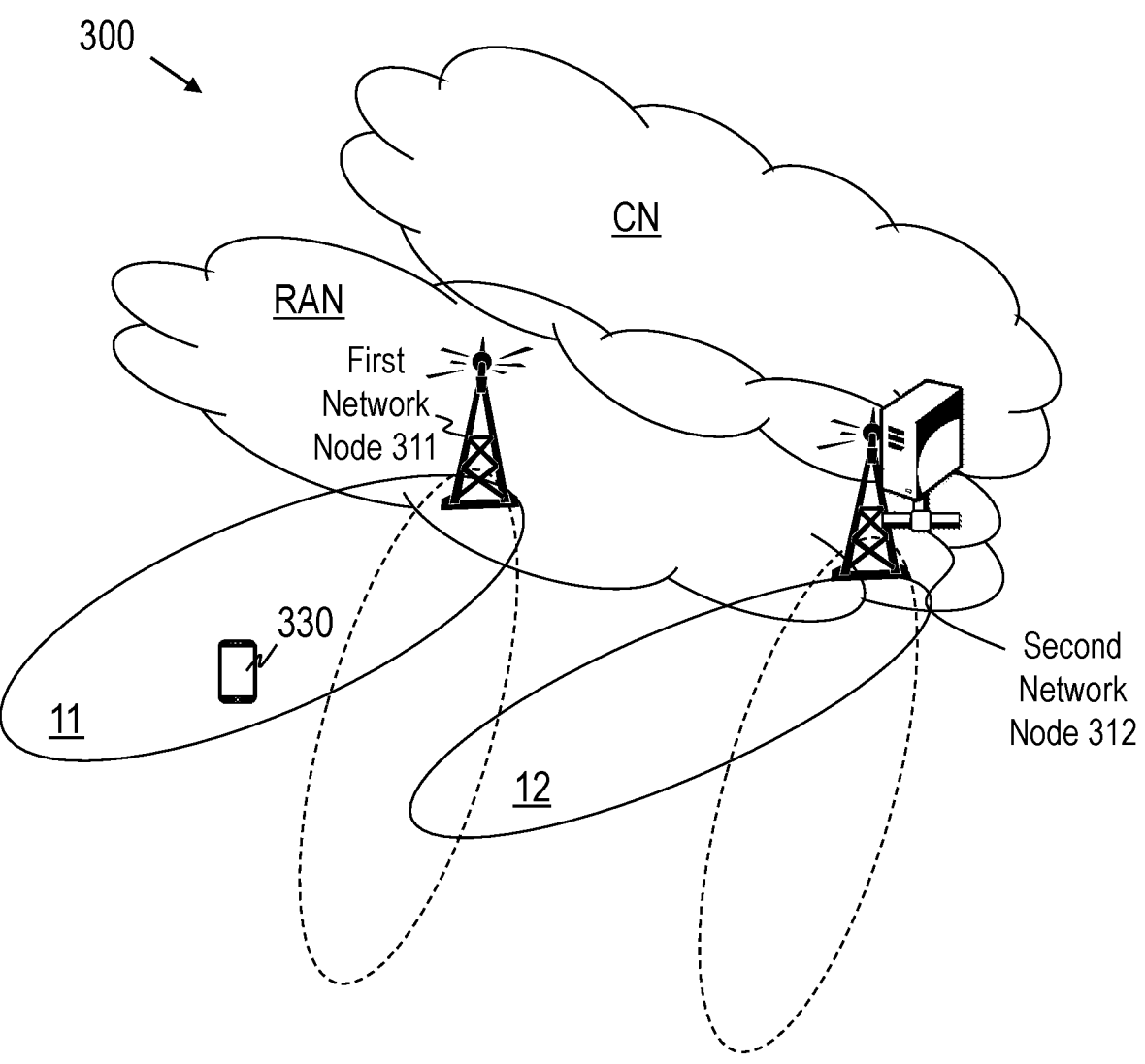
FIG. 3a is a schematic block diagram depicting embodiments of a communication network.

Embodiments herein relate to a communication networks in general. FIG. 3a is a schematic overview depicting a communication network 300. The communication network 300 may be a wireless communications network comprising one or more RANs, and one or more CNs. The communication network 300 may use a number of different technologies, such as Wi-Fi, Long Term Evolution (LTE), LTE-Advanced, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 300, one or more wireless devices e.g. a user equipment 330 such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The terms user equipment 330, UE, UE 330 and wireless device 330 are used interchangeable herein.

Network nodes operate in the wireless communication network 300 such as a first network node 311 and a second network node 312. The RAN node may be any of gNB, eNB, en-gNB, ng-eNB, gNB Central Unit (gNB-CU), gNB-CU-Control Plane (gNB-CU-CP), gNB-CU-User Plane (gNB-CU-UP), eNB Central Unit (eNB-CU), eNB-CU-Control Plane (eNB-CU-CP), eNB-CU-User Plane (eNB-CU-UP), Integrated Access and Backhaul (IAB)-node, IAB-donor Distributed Unit (IAB-donor DU), IAB-donor-CU, IAB-DU, IAB Mobile Termination (IAB-MT), Open RAN Central Unit (O-CU), O-CU-CP, O-CU-UP, O-DU, O-RAN Radio Unit (O-RU), O-eNB. The first network node 311 provides radio coverage over a geographical area, a service area 11, which may also be referred to as a beam or a beam group where the group of beams is covering the service area of a first radio access technology (RAT), such as 5G, LTE, Wi-Fi or similar. The second network node 312 provides radio coverage over a geographical area, a service area 12, which may also be referred to as a beam or a beam group where the group of beams is covering the service area of a first or a second radio access technology (RAT), such as 5G, LTE, Wi-Fi or similar. It should be noted that a network node may be a RAN node, a CN node or an OAM node.

The first and second network nodes 311 and 312 may be a transmission and reception point e.g. a radio access network node such as a Wireless Local Area Network (WLAN) access point or an Access Point Station (AP STA), an access controller, a base station, e.g. a radio base station such as a NodeB, a gNB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the respective first and second network nodes 311 and 312 depending e.g. on the first radio access technology and terminology used. The first and second network nodes 311 and 312 may be referred to as a source and target radio network node, respectively, and may communicate with the wireless device 330 with Downlink (DL) transmissions to the user equipment 330 and Uplink (UL) transmissions from the wireless device 330.

Figure 3B:
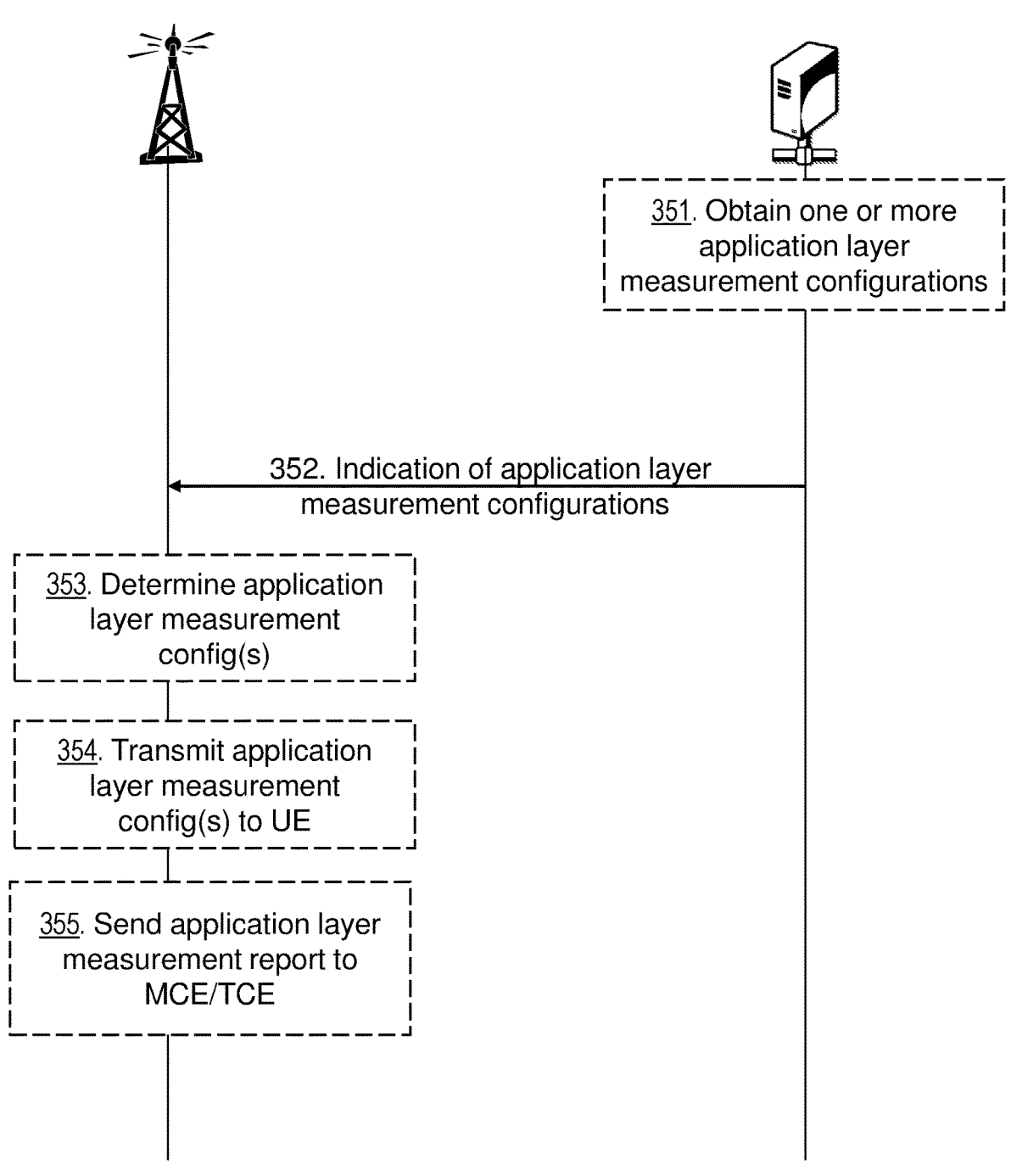
FIG. 3b is a combined signalling schema and flowchart according to embodiments herein.

FIG. 3b shows a schematic combined signalling scheme according to some embodiments herein. Thus, illustrating a solution for handling one or more services in the wireless communication network 300.

Action 351. The second network node 312 such as an OAM node or CN node obtains e.g. receives, a plurality of application layer measurement configurations for one or more services.

Action 352. The second network node 312 transmits to the first network node 311 an indication indicating the plurality of application layer measurement configurations for one or more services. Thus, the first network node 311 receives from the second network node the indication relating to application layer measurement configurations for one or more services for one or more UEs. The indication may be a list of application layer measurement configurations. The list of application layer measurement configurations may comprise a set of QoE measurement configurations for the same or different service types. The list of application layer measurement configurations may further comprise one or more indications for one or more Measurement Collection Entities (MCEs), and/or Trace Collection Entities (TCEs) for receiving QoE measurement reports of the UE.

Action 353. The first network node may then determine which, all, or some of the plurality of application layer measurement configurations for the UE 10.

Action 354. Once determined the first network node 311, the first network node 311 may transmit one or more application layer measurement configurations out of the list of application layer measurement configurations to one or more UEs, (or transmits an indication of the determined one or more application layer measurement configurations).

Action 355. The first network node 311 may then send QoE measurement reports from the UE to corresponding MCEs and/or TCEs based on the application layer measurement configurations.

According to some embodiments herein, each application layer measurement configuration in the list of application layer measurement configurations may include an indication to indicate one or more of the following:

a) whether an application layer measurement configuration is a legacy QoE measurement configuration or a lightweight QoE measurement configuration;

b) whether an application layer measurement may be stored, applied or executed in parallel with a legacy QoE measurement configuration in a wireless communication device;

c) whether an application layer measurement may be stored, applied or executed in parallel with a lightweight QoE measurement configuration in a wireless communication device;

d) a type of QoE measurement configuration.

According to embodiments herein a method performed by the second network node 312 is provided for handling one or more services in the wireless communication network 300. The second network node 312 transmits to a first network node 311 an indication relating to application layer measurement configurations for one or more services for one or more UEs. The indication may be a list of application layer measurement configurations.

Example embodiments will be described in the following.

Embodiments Related to Scenario: "Multiple QoE Measurement Configurations at Setup"

For this scenario, the first network node 311 is a RAN node, e.g. a gNB or an eNB, and the second network node 312 may be another RAN node, a 5GC node, an OAM, an SMO or an NMS.

The first network node 311 receives from the second network node 312 a list of QoE measurement configurations e.g. in an NGAP INITIAL CONTEXT SETUP REQUEST message or an X2AP SGNB ADDITION REQUEST message or from an OAM node. Each QoE measurement configuration comprises one or more of the following:

a container for application layer measurement configuration.

an identifier of the application layer measurement configuration, i.e. an identifier outside the container referring to this specific configuration.

an indication of an area scope e.g. as indicated in 36.413 v16.3.0.

one identifier indicating the service type of UE application layer measurements or a list of identifiers of service types, e.g. if a common set of QoE metrics is applicable for a set of services.

one identifier or a list of identifiers of one of more specific UEs.

one indication e.g. an IP address or an URL or a list of indications that can be used by the RAN node to send QoE measurement reports to the MCE.

An indication indicating the type of the application layer measurement configuration, the indication indicates the configuration is a legacy QoE measurement configuration including a QMC configuration file or a lightweight QoE measurement configuration.

an indication indicating the type of the QoE measurement configuration, the indication indicates whether the QoE measurement configuration is a signaling based QoE measurement configuration or a management based QoE measurement configuration or a hybrid version i.e., a combined management based and signaling based QoE measurement.

A priority indication, to be used for prioritizing between the multiple QoE measurement configurations, in case the UE, which has received the QoE measurement configurations, at some point is unable to perform QoE measurements in accordance with all the configured QoE measurement configurations which conditions for execution are fulfilled, e.g. due to resource constraints or conflicting configuration instructions.

The first network node may use the list of application layer measurement configurations to configure one or more UEs to perform application layer measurements according to the received information.

The network node may also identify the specific QoE configuration and recognize whether two containers contain the same QoE configuration. In addition, the network node receiving the QoE measurement configuration may be capable to detect the type of the configured measurements i.e., legacy QoE measurement or a lightweight QoE measurement. Moreover, the network node receiving the list of application layer measurement configurations, may detect whether the configured QoE measurement configurations are related to the signaling based QoE or management based QoE.

Figure 4:
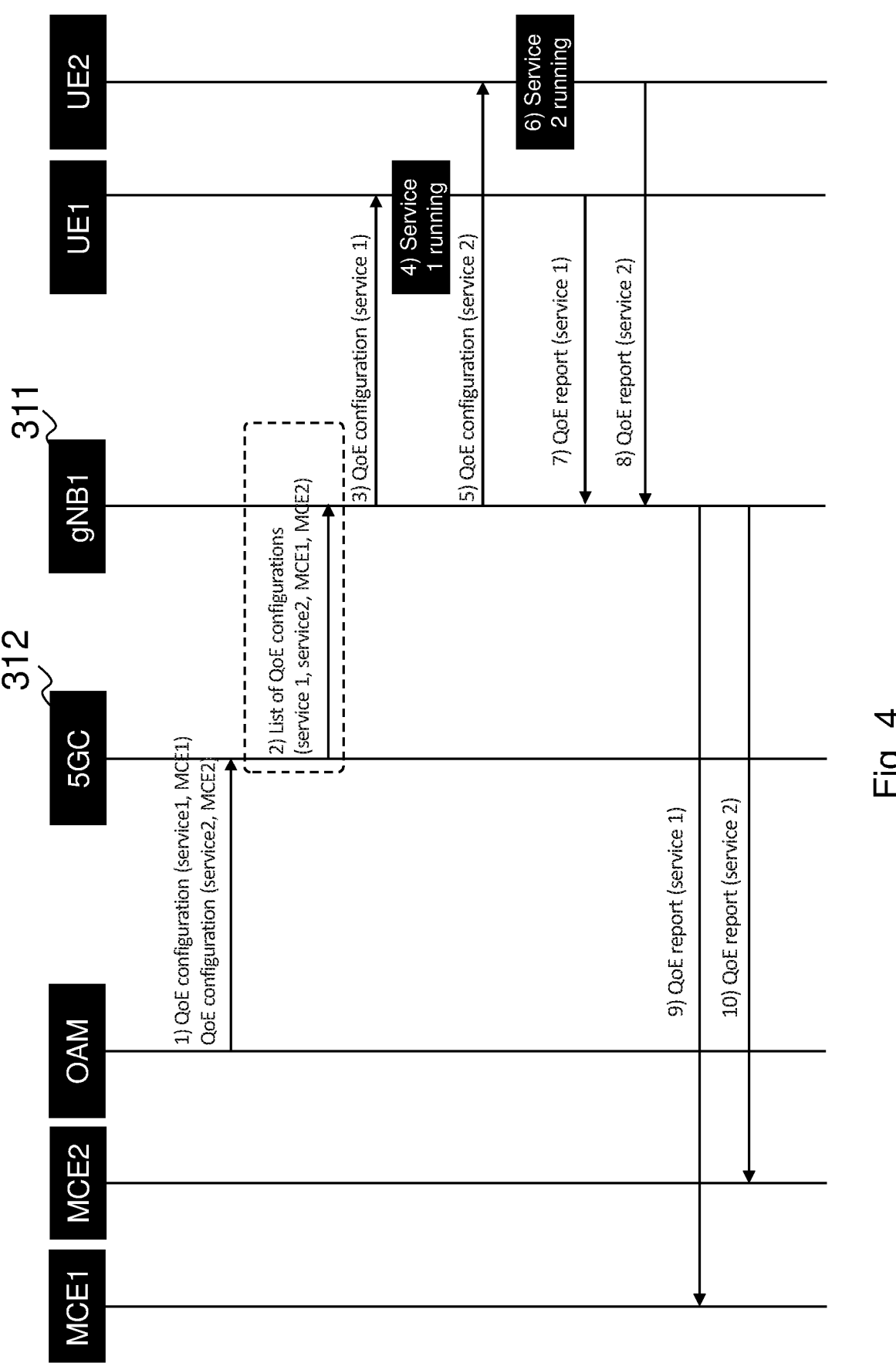
FIG. 4 is a signaling diagram illustrating an example embodiment of a multiple QoE configurations sent from OAM to a RAN node via 5GC, where different QoE configurations are sent to different UEs.

FIG. 4 shows an example of signaling flows for QoE configurations according to embodiments herein. A multiple QoE configurations is sent from OAM to a RAN node via Different QoE configurations are sent to different UEs.

As shown in FIG. 4, in step 2) indicated by a dotted line box where it is impacted according to embodiments herein, the list of QoE measurement configurations relates to two services, service 1 and service 2, and two different MCEs are indicated, so that, e.g. QoE reports for service 1 will be sent from the RAN node to the MCE1, and QoE reports for service 2 will be sent from the RAN node to the MCE2. The QoE measurement configurations related to service 1 is used to configure UE1, QoE measurement configurations related to service 2 is used to configure UE2.

Figure 5:
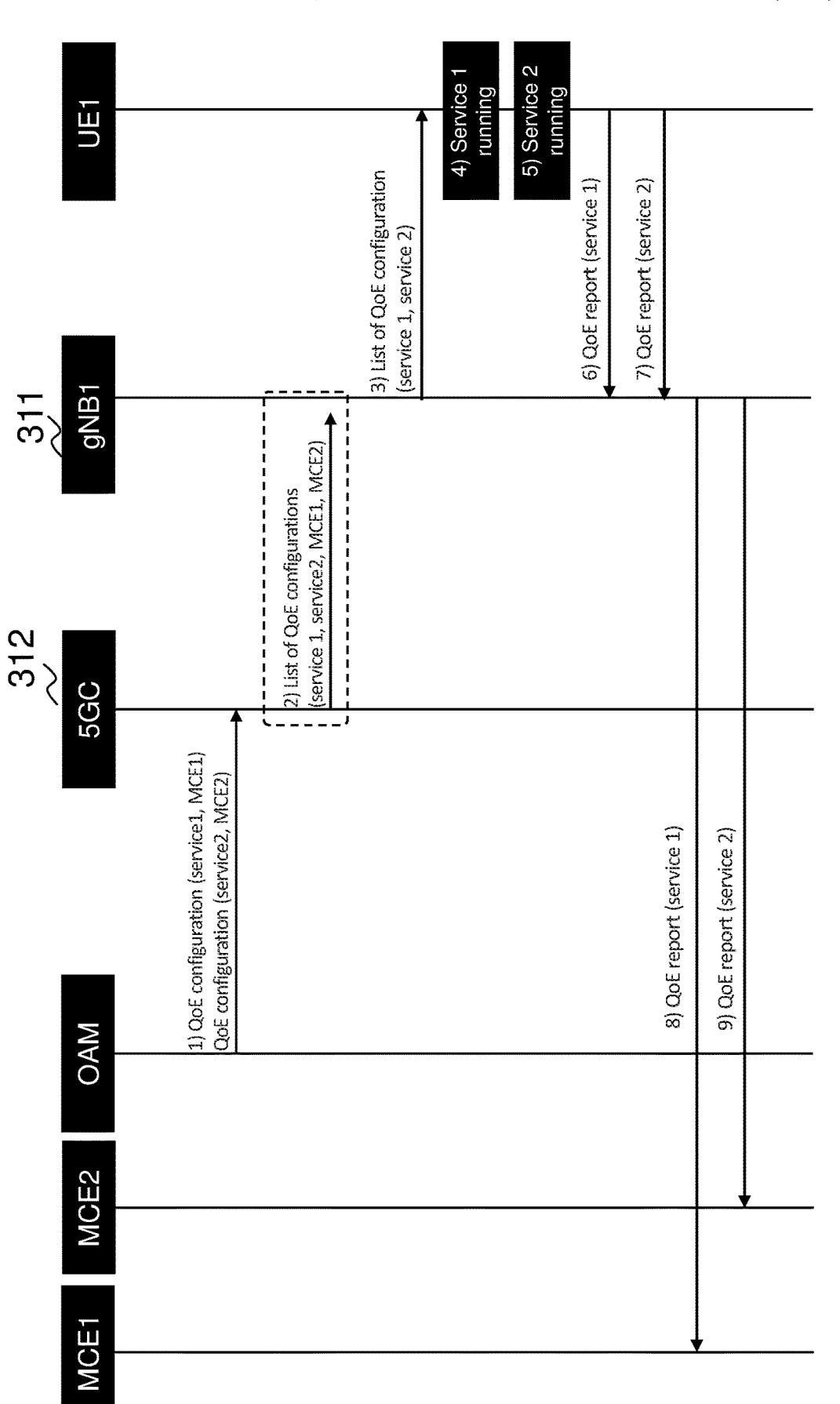
FIG. 5 is a signaling diagram illustrating an example embodiment of a multiple QoE configurations sent from OAM to a RAN node via 5GC, where different QoE configurations are sent to the same UE.

FIG. 5 shows another example of signaling flows for QoE configurations according to embodiments herein. The situation is similar to the previous example in FIG. 4, but in this case both QoE measurement configurations related to service 1 and service 2 are used to configure UE1, i.e. different QoE configurations are sent to the same UE.

Embodiments Related to Scenario: "Multiple QoE Measurement Configurations at Mobility"

In this scenario, the first network node 311 is a first RAN node and the second network node 312 is a second RAN node.

This scenario is applicable at least in the following cases:
a) Mobility e.g. XnAP Handover Preparation, X2AP SgNB Change or XnAP SCell addition procedures;
b) Inter-RAN node, e.g. inter-gNB or inter-eNB, retrieval of UE Context e.g. in case of RRC Re-establishment or RRC Resume.

In the mobility case, according to embodiments herein, the first network node 311 is the RAN node targeted by the mobility procedure, i.e. target RAN node, the second network node 312 is the RAN node initiating the mobility procedure, i.e. source RAN node.

The source RAN node sends to the target RAN node a message, e.g. an XnAP HANDOVER REQUEST message, an X2AP SGNB CHANGE REQUIRED message, including a list of QoE measurement configurations. Each one of the multiple QoE measurement configurations may comprise the same information as detailed for the scenario "Multiple QoE measurement configurations at Setup".

The target RAN node may acknowledge the request e.g. via an XnAP HANDOVER REQUEST ACKNOWLEDGE message, an X2AP SGNB CHANGE CONFIRM message, to indicate that the list of QoE measurement configurations is accepted; or the target RAN node may indicate that the preparation failed, e.g. using an XnAP HANDOVER PREPARATION FAILURE message, an X2AP SGNB CHANGE REFUSE message.

Figure 6:
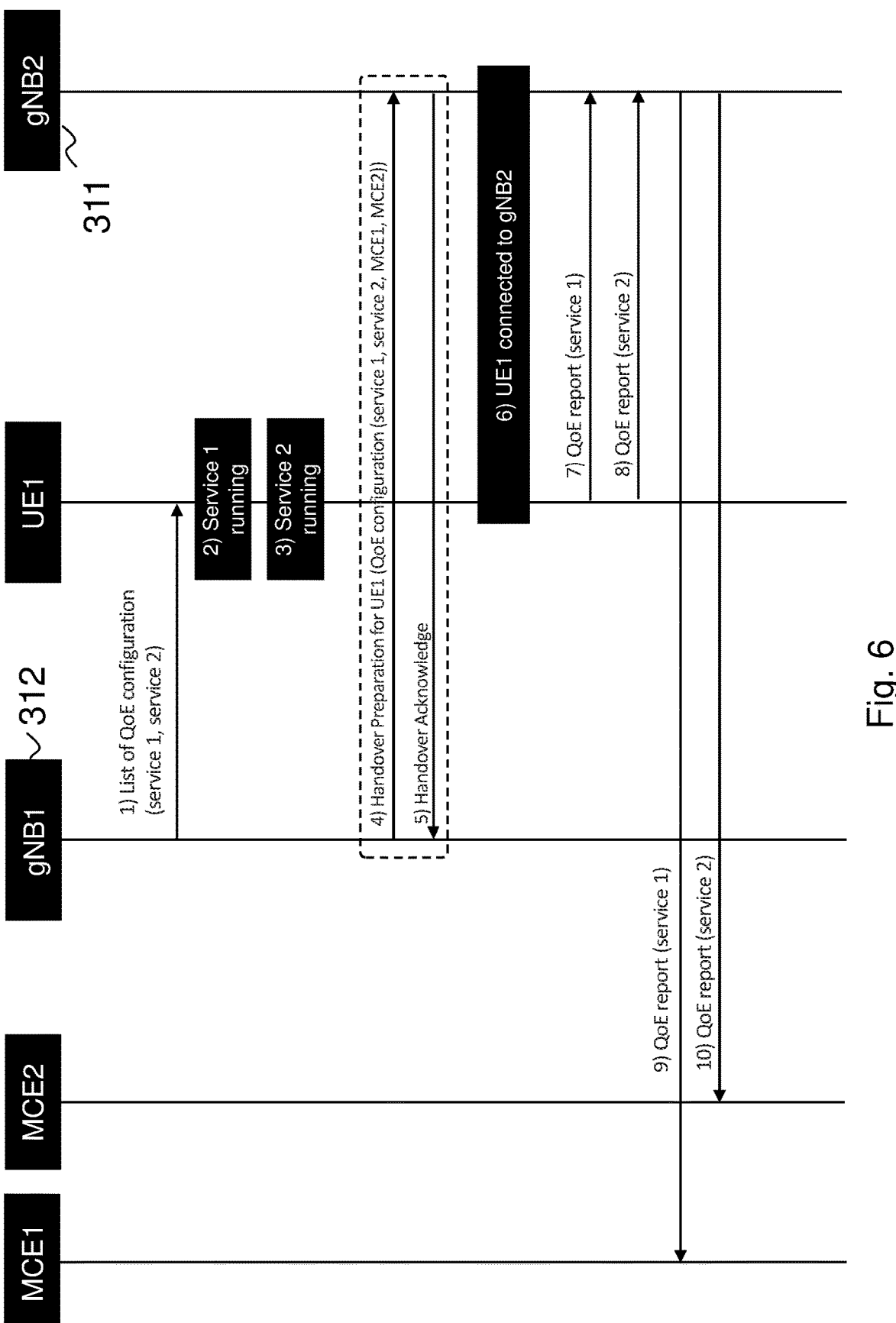
FIG. 6 is a signaling diagram illustrating an example embodiment of mobility where multiple QoE configurations for the same UE are sent from the second network node, gNB1, to the first network node, AMF.

An example of signaling flow for the mobility case via XnAP according to embodiments herein is shown in FIG. 6, where the gNB1 is the source RAN node and the gNB2 is the target RAN node. As shown in FIG. 6, the procedure in steps 4) and 5) indicated by a dotted line box is impacted according to embodiments herein. The list of QoE measurement configurations related to two services, e.g. service 1 and service 2 and contact information for two different MCEs are transferred as part of the Handover Preparation procedure, e.g. in an XnAP HANDOVER REQUEST message, from the source RAN node to the target RAN node.

As shown in FIG. 6, multiple QoE configurations for the same UE are sent from the second network node 312 being exemplified as a first RAN node gNB1 to the first network node being exemplified as a second RAN node gNB2. Note that before the first message in this example signaling flow, gNB1 has received the QoE measurement configurations from an OAM node or a core network node.

Figure 7:
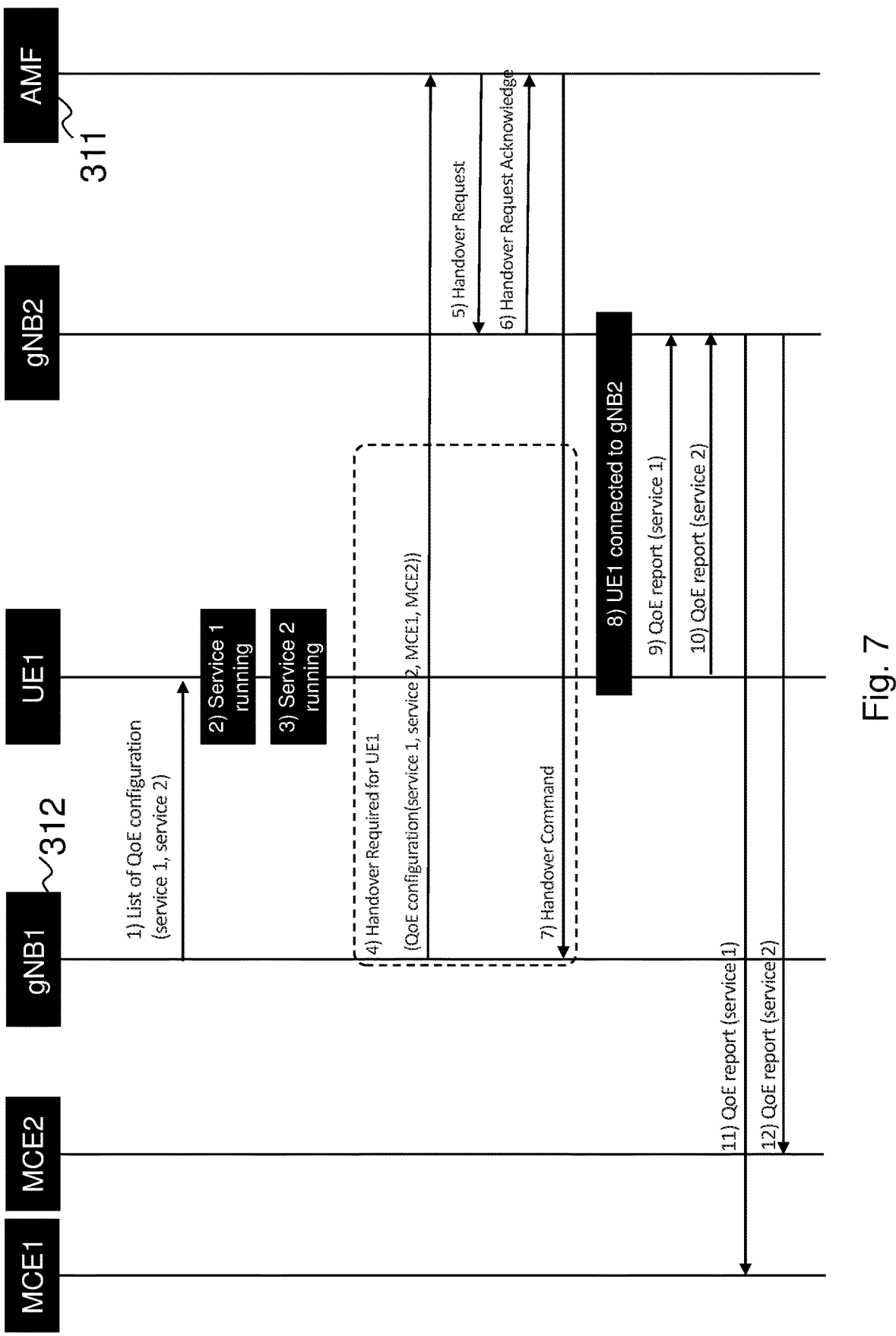
FIG. 7 is a signaling diagram illustrating an example embodiment of mobility where multiple QoE configurations for the same UE are sent from the second network node, gNB1, to the first network node, gNB2.

Another example of signaling flow for the mobility case via NGAP according to embodiments herein is provided in FIG. 7, where the gNB1 is the source RAN node and the gNB2 is the target RAN node. Similarly to the XnAP procedure of FIG. 6, also for this case the list of QoE measurement configurations related to two services e.g. service 1 and service 2 and contact information for two different MCEs are transferred from the source RAN node to the target RAN node. As shown in FIG. 7, the procedure in steps 4) and 7) indicated by a dotted line box is impacted according to embodiments herein.

As shown in FIG. 7, multiple QoE configurations for the same UE are sent from the second network node 312 such as the first RAN node gNB1 to the first network node 311 such as the AMF forwarding it to second RAN node gNB2. Note that before the first message in this example signaling flow, gNB1 has received the QoE measurement configurations from an OAM node or a core network node.

For the case of Retrieval of UE context, according to embodiments herein, the first network node 311 is the RAN node needing to fetch the UE Context, i.e. target RAN node and the second network node 312 is the RAN node hosting the UE Context, i.e source RAN node.

The target RAN node requests to the source RAN node to fetch the UE context e.g. in an XnAP RETRIEVE UE CONTEXT REQUEST message or in X2AP RETRIEVE UE CONTEXT REQUEST message.

The source RAN node may acknowledge the request and include in the response towards the target RAN node a list of QoE measurement configurations e.g. in an XnAP RETRIEVE UE CONTEXT RESPONSE message or in X2AP RETRIEVE UE CONTEXT RESPONSE message. Each one of the multiple QoE measurement configurations may comprise the same information as detailed for the scenario "Multiple QoE measurement configurations at Setup".

Figure 8:
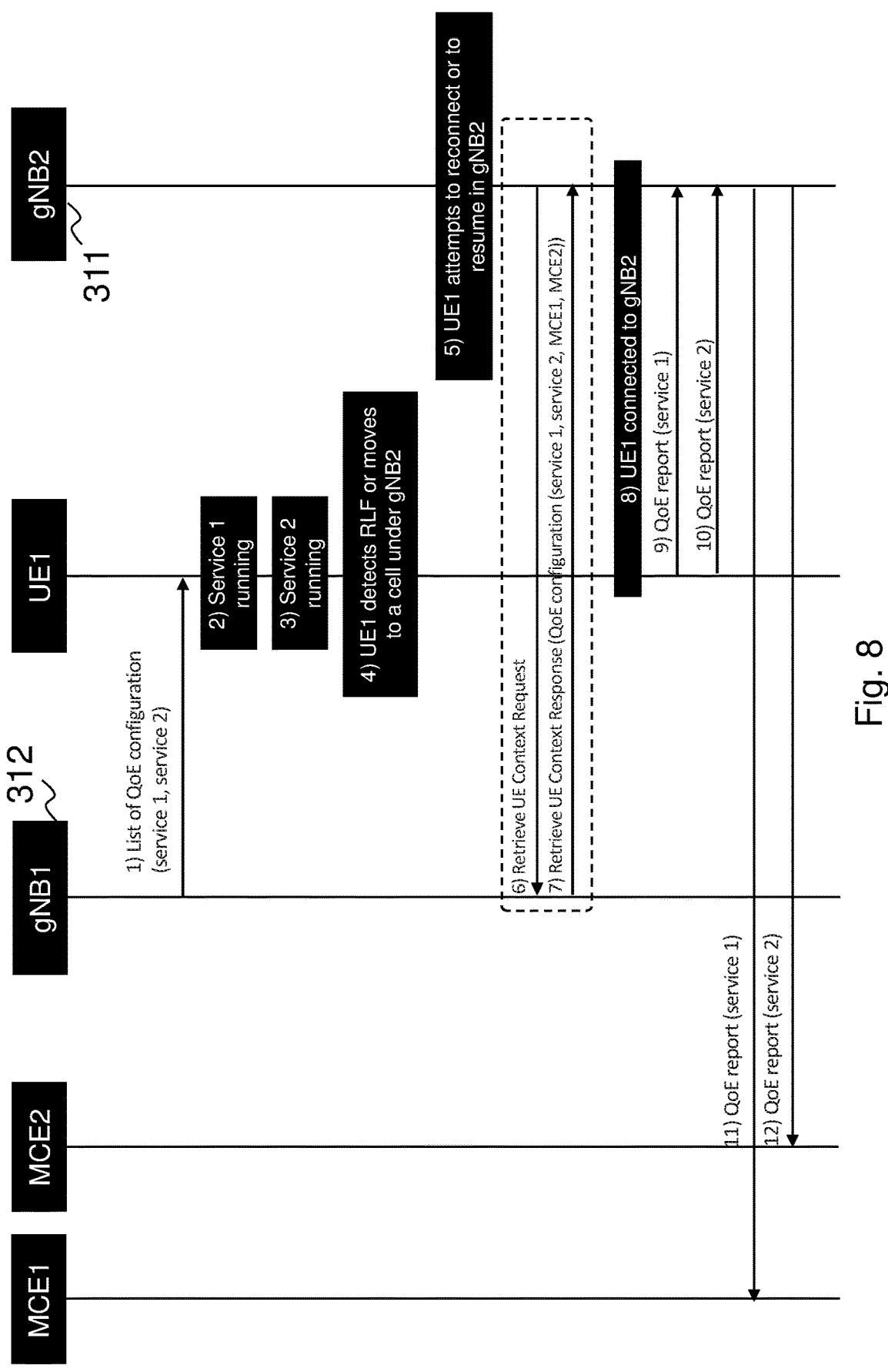
FIG. 8 is a signaling diagram illustrating an example embodiment of multiple QoE configurations fetched from the node hosting UE Context.

An example of signaling flow for the case of Retrieval of UE Context according to embodiments herein is shown in FIG. 8, where multiple QoE configurations are fetched from the network node hosting UE Context. The gNB1 is the source RAN node, the gNB2 is the target RAN node. Note that before the first message in this example signaling flow, gNB1 has received the QoE measurement configurations from an OAM node or a core network node. As shown in FIG. 8, the procedure in steps 6) and 7) indicated by a dotted line box is impacted according to embodiments herein.

Embodiments Related to Scenario: "Multiple QoE Measurement Configurations in Multi Connectivity"

In this scenario, the first network node 311 is a first RAN node and the second network node 312 is a second RAN node.

This scenario is applicable at least for the following cases:
a) Multi Connectivity related class 1 elementary procedures e.g. XnAP S-NG-RAN node Addition Preparation, X2AP SgNB Addition Preparation, X2AP SeNB Addition Preparation procedures.
b) Multi Connectivity related class 2 elementary procedures e.g. Trace Start procedures.

For Multi Connectivity related procedures, according to embodiments herein, the first network node 311 is the RAN node targeted by the procedure, i.e. target RAN node, the second network node 312 is the RAN node initiating the procedure i.e. source RAN node.

For the case of Multi Connectivity related class 1 elementary procedures:
the source RAN node sends to the target RAN node a request message e.g. an X2AP SGNB ADDITION REQUEST message or an XnAP S-NODE ADDITION REQUEST message, including multiple QoE measurement configurations. Each one of the multiple QoE measurement configurations may comprise the same information as detailed for the scenario "Multiple QoE measurement configurations at Setup".
the target RAN node may accept the request e.g. via an X2AP SGNB ADDITION REQUEST ACKNOWLEDGE message or an XnAP S-NODE ADDITION REQUEST ACKNOWLEDGE message to indicate that the QoE measurement configurations is accepted, or not accept the request e.g. responding to the source RAN node with an X2AP SGNB ADDITION REQUEST REJECT message or an XnAP S-NODE ADDITION REQUEST REJECT message.

For the case of Multi Connectivity related class 2 elementary procedures:

the source RAN node sends to the target RAN node a request message e.g. a TRACE START message, including multiple QoE measurement configurations. Each one of the QoE measurement configurations may comprise the same information as detailed for the scenario "Multiple QoE measurement configurations at Setup".

Figure 9:
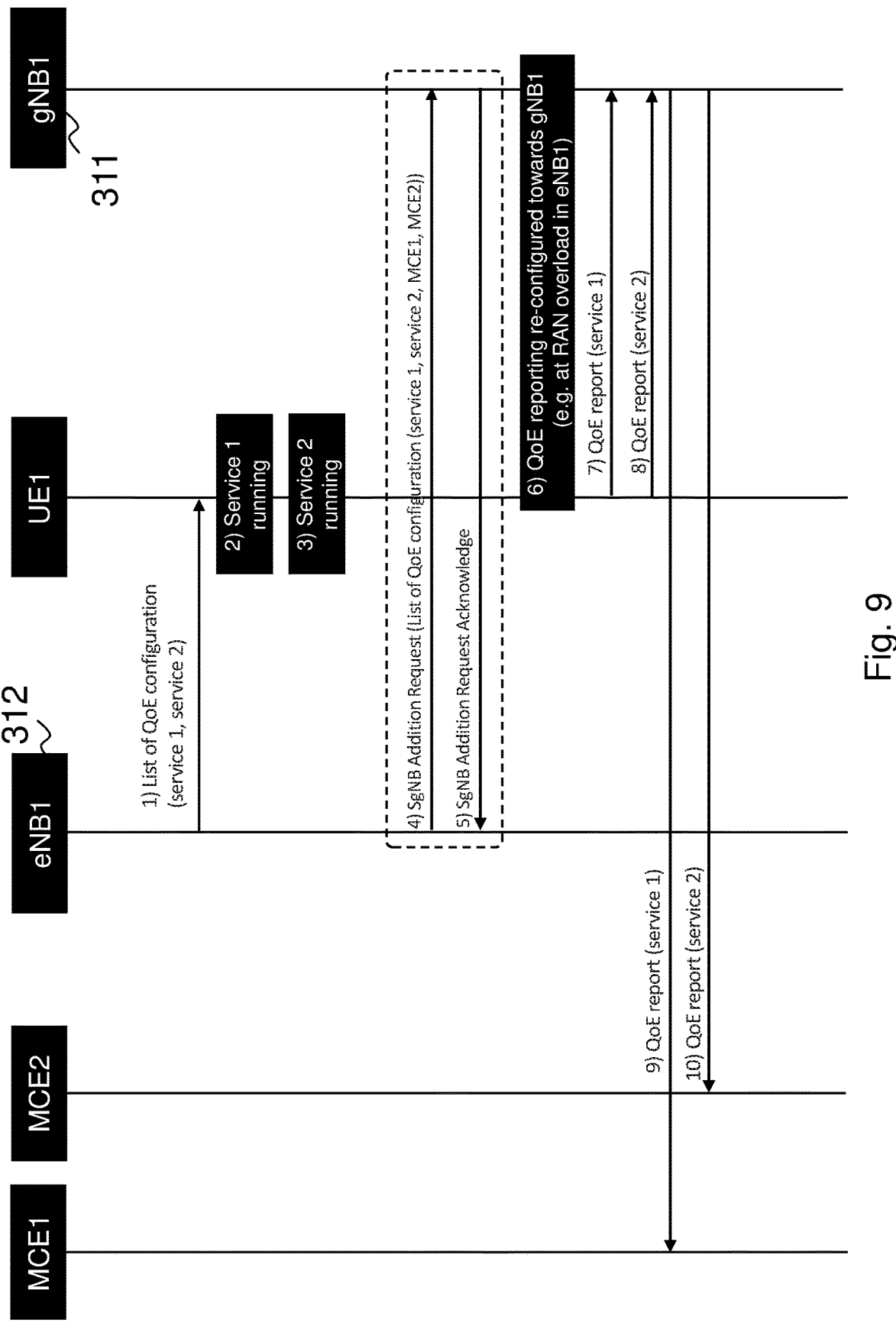
FIG. 9 is a signaling diagram illustrating an example embodiment of multiple QoE configurations sent with SgNB Addition in Dual Connectivity.

An example of signaling flow for the case of SgNB Addition according to embodiments herein is shown in FIG. 9. The eNB1 is the source RAN node, the gNB1 is the target RAN node. The SGNB ADDITION REQUEST message in step 4 is used to convey the QoE measurement configurations. In case of reconfiguration of the radio bearer used by the UE to report the QoE measurements e.g. when RAN overload is detected at the source RAN node, the target RAN node will be able to forward such QoE reports towards the pertaining MCE.

As shown in FIG. 9, the procedure in steps 4) and 5) indicated by a dotted line box is impacted according to embodiments herein, and multiple QoE configurations are sent with SgNB Addition Request message in Dual Connectivity. Note that before the first message in this example signaling flow, eNB1 has received the QoE measurement configurations from an OAM node or a core network node.

Figure 10:
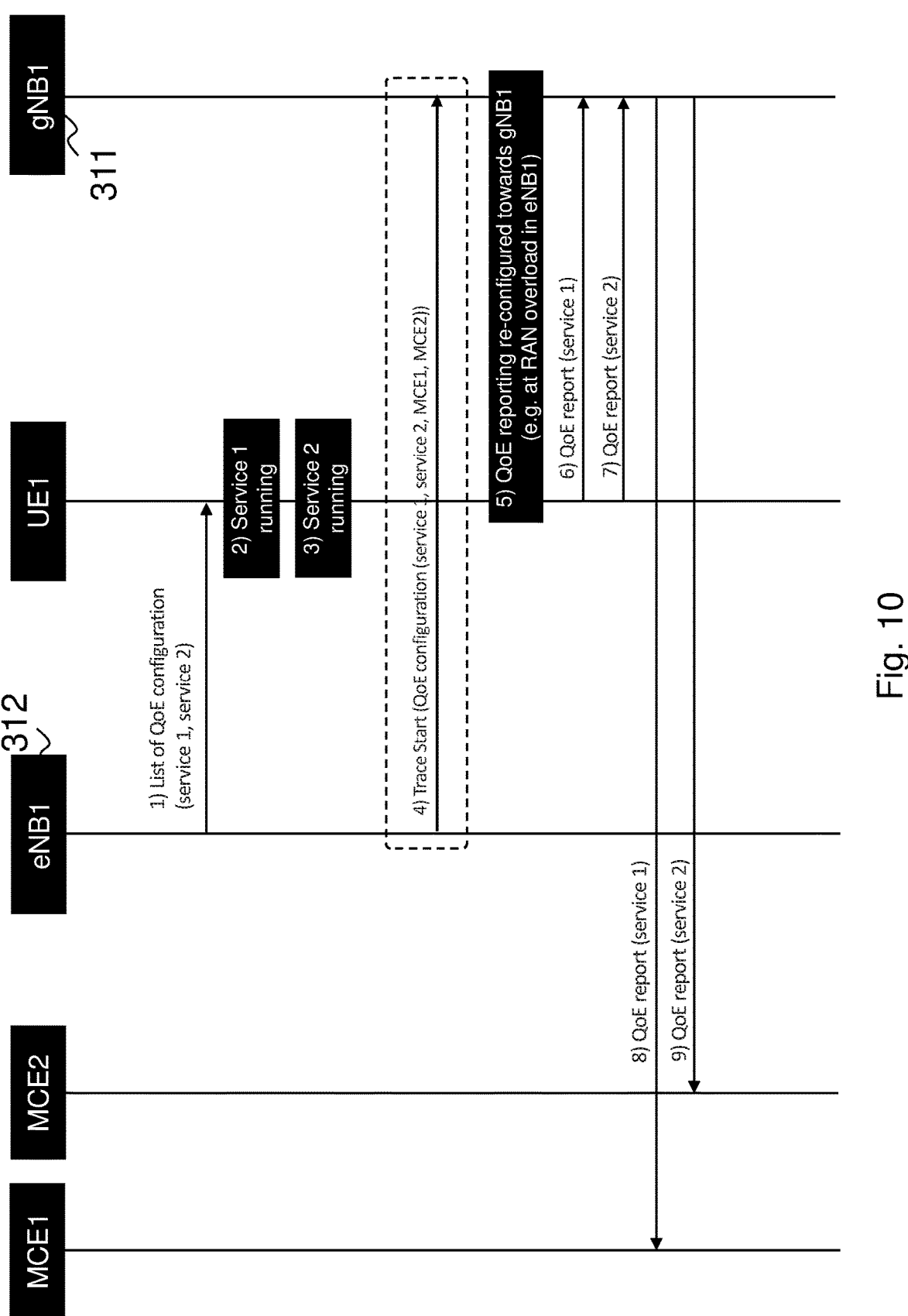
FIG. 10 is a signaling diagram illustrating an example embodiment of a multiple QoE configurations sent with Trace Start in Dual Connectivity.

An example of signaling flow for the case of Trace Start according to embodiments herein is shown in FIG. 10. The eNB1 is the source RAN node, the gNB1 is the target RAN node. The Trace Start message in step 4 is impacted according to embodiments herein and used to forward the QoE measurement configurations. In case of reconfiguration of the radio bearer used by the UE to report the QoE measurements e.g. when RAN overload is detected at the source RAN node, the target RAN node will be able to forward such QoE reports towards the pertaining MCE.

As shown in FIG. 10, multiple QoE configurations are sent with Trace Start message in Dual Connectivity. Note that before the first message in this example signaling flow, gNB1 has received the QoE measurement configurations from an OAM node or a core network node.

Example of Implementation for LTE

An example of implementation is provided below for S1AP (TS 36.413), where the bolded text relates to embodiments herein.

The following table defines parameters related to a trace activation (9.2.1.4 Trace Activation).

| IE/Group Name | Presence | Range | IE type and reference | Semantics description | Criticality | Assigned Criticality |
|---|---|---|---|---|---|---|
| E-UTRAN Trace ID | M | | OCTET STRING (SIZE(8)) | The E-UTRAN Trace ID IE is composed of the following: Trace Reference defined in TS 32.422 [10] (leftmost 6 octets, with PLMN information coded as in 9.2.3.8), and Trace Recording Session Reference defined in TS 32.422 [10] (last 2 octets). | | |
| Interfaces To Trace | M | | BIT STRING (SIZE(8)) | Each position in the bitmap represents an eNB or en-gNB interface: first bit =S1-MME, second bit =X2, third bit =Uu, fourth bit =F1-C, fifth bit =E1: other bits reserved for future use. Value '1' indicates 'should be traced'. Value '0' indicates 'should not be traced'. | | |
| Trace depth | M | | ENUMERATED( minimum, medium, maximum, MinimumWithoutVendorSpecificExtension, MediumWithoutVendorSpecificExtension, MaximumWithoutVendorSpecificExtension, ...) | Defined in TS 32.422 [10]. | | |
| Trace Collection Entity IP Address | M | | Transport Layer Address 9.2.2.1 | Defined in TS 32.422 [10]. | | |
| MDT Configuration | O | | 9.2.1.81 | | YES | ignore |
| UE Application layer measurement configuration | O | | 9.2.1.128 | | YES | Ignore |

-continued

| MDT Configuration NR | O | | OCTET STRING | | Defined in TS 38.413 [44]. Only the immediate MDT configurations are included in the IE in this version of the specification. | YES | Ignore |
|---|---|---|---|---|---|---|---|
| Additional UE application layer measurement configuration List | 0 .. <maxnoofAdditionalQMC-1> | | | | | YES | Ignore |
| > Additional UE application layer measurement configuration Item | | | 9.2.1.128 | | | YES | Ignore |
| > Measurement Collection Entity List | 0 .. <maxnoofMCE> | | | | | YES | Ignore |
| >> Measurement Collection Entity Item | | | 9.x.x | | | YES | Ignore |

| Range bound | Explanation |
|---|---|
| maxnoofAdditionalQMC-1 | Maximum no. of Additional QMC measurements. Value is 7. |
| maxnoofMCE | Maximum no. of MCE. Value is 8. |

Where 9.x.x is Measurement Collection Entity Item. This information element indicates the Measurement Collection Entity.

| IE/Group Name | Presence | Range | IE type and reference | Semantics description | Criticality | Assigned Criticality |
|---|---|---|---|---|---|---|
| CHOICE MCE Address Type | | | | | YES | Reject |
| > Transport Layer Address | | | | | | |
| >> MCE IP Address | | | BIT STRING (1..160,...) | For details on the Transport Layer Address, see TS 36.424 [8], TS 36.414 [19] | | |
| > URL | | | | | | |
| >> MCE URL | | | OCTET STRING | The URL identifying the MCE. | | |

The flowing table, 9.2.1.128 UE Application layer measurement configuration, shows the IE which defines configuration information for the QoE Measurement Collection (QMC) function.

| IE/Group Name | Presence | Range | IE type and reference | Semantics description | Criticality | Assigned Criticality |
|---|---|---|---|---|---|---|
| Container for application layer measurement configuration | M | | Octet string (1..1000) | Indicates application layer measurement configuration, see Annex L in [43]. | — | — |
| CHOICE Area Scope of QMC | M | | | | — | — |
| >Cell based | | | | | | — |
| >>Cell ID List for | | 1 .. | | | | — |

-continued

| | | | | | | |
|---|---|---|---|---|---|---|
| QMC | | \<maxnoofCellIDforQMC> | | | | |
| >>>E-CGI | M | | 9.2.1.38 | | — | — |
| >TA based | | | | | | — |
| >>TA List for QMC | | 1 .. \<maxnoofTAforQMC> | | | | — |
| >>>TAC | M | | 9.2.3.7 | The TAI is derived using the current serving PLMN. | — | — |
| >TAI based | | | | | — | — |
| >>TAI List for QMC | | 1 .. \<maxnoofTAforQMC> | | | | — |
| >>>TAI | M | | 9.2.3.16 | | — | — |
| >PLMN area based | | | | | | — |
| >>PLMN List for QMC | | 1 .. \<maxnoofPLMNforQMC> | | | | — |
| >>>PLMN Identity | M | | 9.2.3.8 | | — | — |
| Service Type | M | | ENUMERATED (QMC for streaming service, QMC for MTSI service, ...) | This IE indicates the service type of UE application layer measurements. | — | — |

| Range bound | Explanation |
|---|---|
| maxnoofCellIDforQMC | Maximum no. of Cell ID subject for QMC scope. Value is 32. |
| maxnoofTAforQMC | Maximum no. of TA subject for QMC scope. Value is 8. |
| maxnoofPLMNforQMC | Maximum no. of PLMNs in the PLMN list for QMC scope. Value is 16. |

An example of implementation is provided below for X2AP (TS 36.423), where the bolded text relates to embodiments herein.

The following table, 9.2.2 Trace Activation, defines parameters related to trace activation.

| IE/Group Name | Presence | Range | IE type and reference |
|---|---|---|---|
| E-UTRAN Trace ID | M | | OCTET STRING (8) |
| Interfaces To Trace | M | | BIT STRING (8) |
| Trace Depth | M | | ENUMERATED( minimum, medium, maximum, MinimumWithoutVendorSpecificExtension, MediumWithoutVendorSpecificExtension, MaximumWithoutVendorSpecificExtension, ...) |
| Trace Collection Entity IP Address | M | | BIT STRING (1..160,...) |
| MDT Configuration | O | | 9.2.56 |
| UE Application layer measurement configuration | O | | 9.2.121 |
| MDT Configuration NR | O | | OCTET STRING |
| Additional UE application layer measurement configuration List | | 0 .. \<maxnoofAdditionalQMC-1> | |
| > Additional UE application layer measurement configuration Item | | | 9.2.1.128 |
| > Measurement Collection Entity List | | 0 .. \<maxnoofMCE> | |
| >> Measurement Collection Entity Item | | | 9.x.x |

-continued

| IE/Group Name | Semantics description | Criticality | Assigned Criticality |
|---|---|---|---|
| E-UTRAN Trace ID | The E-UTRAN Trace ID IE is composed of the following: Trace Reference defined in TS 32.422 [6] (leftmost 6 octets, with PLMN information coded as in 9.2.4), and Trace Recording Session Reference defined in TS 32.422 [6] (last 2 octets) | — | |
| Interfaces To Trace | Each position in the bitmap represents a eNB interface: first bit =S1-MME, second bit =X2, third bit =Uu, fourth bit = F1-C, fifth bit = E1. Other bits reserved for future use. Value '1' indicates 'should be traced'. Value '0' indicates 'should not be traced'. | — | |
| Trace Depth | Defined in TS 32.421 [7] | — | |
| Trace Collection Entity IP Address | For details on the Transport Layer Address, see TS 36.424 [8], TS 36.414 [19] | — | |
| MDT Configuration | | YES | ignore |
| UE Application layer measurement configuration | | YES | ignore |
| MDT Configuration NR | Defined in TS 38.413 [39]. Only the immediate MDT configurations are included in the IE in this version of the specification. | YES | Ignore |
| Additional UE application layer measurement configuration List | | YES | Ignore |
| > Additional UE application layer measurement configuration Item | | YES | Ignore |
| > Measurement Collection Entity List | | YES | Ignore |
| >> Measurement Collection Entity Item | | YES | Ignore |

| Range bound | Explanation |
|---|---|
| maxnoofAdditionalQMC-1 | Maximum no. of Additional QMC measurements. Value is 7. |
| maxnoofMCE | Maximum no. of MCE. Value is 8. |

Where 9.x.x is Measurement Collection Entity Item. This information element indicates the Measurement Collection Entity.

| IE/Group Name | Presence | Range | IE type and reference | Semantics description | Criticality | Assigned Criticality |
|---|---|---|---|---|---|---|
| CHOICE MCE Address Type | | | | | YES | Reject |
| > Transport Layer Address | | | | | | |

-continued

| IE/Group Name | Presence | Range | IE type and reference | Semantics description | Criticality | Assigned Criticality |
|---|---|---|---|---|---|---|
| >> MCE IP Address | | | BIT STRING (1..160,...) | For details on the Transport Layer Address, see TS 36.424 [8], TS 36.414 [19] | | |
| > URL | | | | | | |
| >> MCE URL | | | OCTET STRING | The URL identifying the MCE. | | |

Example of Implementation for NG-RAN:

An example of implementation is provided below for NGAP (TS 38.413), where the bolded text relates to embodiments herein.

The following table 9.3.1.14 Trace Activation, shows the IE which defines parameters related to a trace session activation.

| IE/Group Name | Presence | Range | IE type and reference | Semantics description | Criticality | Assigned Criticality |
|---|---|---|---|---|---|---|
| NG-RAN Trace ID | M | | OCTET STRING (SIZE(8)) | This IE is composed of the following: Trace Reference defined in TS 32.422 [11] (leftmost 6 octets, with PLMN information encoded as in 9.3.3.1), and Trace Recording Session Reference defined in TS 32.422 [11] (last 2 octets). | — | |
| Interfaces to Trace | M | | BIT STRING (SIZE(8)) | Each position in the bitmap represents an NG-RAN node interface: first bit = NG-C, second bit = Xn-C, third bit = Uu, fourth bit = F1-C, fifth bit = E1: other bits reserved for future use. Value '1' indicates 'should be traced'. Value '0' indicates 'should not be traced'. | — | |
| Trace Depth | M | | ENUMERATED (minimum, medium, maximum, minimumWithoutVendorSpecificExtension, mediumWithoutVendorSpecificExtension, maximumWithoutVendorSpecificExtension, ...) | Defined in TS 32.422 [11]. | — | |
| Trace Collection Entity IP Address | M | | Transport Layer Address 9.3.2.4 | For File based Reporting. Defined in TS 32.422 [11]. This IE is ignored if the Trace Collection Entity URI IE is present. | — | |
| MDT Configuration | O | | 9.3.1.167 | | YES | ignore |
| Trace Collection Entity URI | O | | URI 9.3.2.14 | For Streaming based Reporting. Defined in TS 32.422 [11]. | YES | Ignore |

-continued

| | | | | | | |
|---|---|---|---|---|---|---|
| UE application layer measurement configuration List | 0 ..<br><maxnoofQMC> | | | | YES | Ignore |
| > UE application layer measurement configuration Item | | 9.3.1.xxx | | | YES | Ignore |
| > Measurement Collection Entity List | 0 ..<br><maxnoofMCE> | | | | YES | Ignore |
| >><br>Measurement Collection Entity Item | | 9.x.x | | | YES | Ignore |

| Range bound | Explanation |
|---|---|
| maxnoofQMC | Maximum no. of QMC measurements. Value is 8. |

Where 9.3.1.xxx is UE Application layer measurement configuration. The IE defines configuration information for the QoE Measurement Collection (QMC) function.

| IE/Group Name | Presence | Range | IE type and reference | Semantics description | Criticality | Assigned Criticality |
|---|---|---|---|---|---|---|
| Container for application layer measurement configuration | M | | Octet string (1..1000) | Indicates application layer measurement configuration. | — | |
| CHOICE Area Scope of QMC | M | | | | — | |
| >Cell based | | | | | | |
| >>Cell ID List for QMC | | 1 ..<br><maxnoofCellIDforQMC> | | | | |
| >>>NR CGI | M | | 9.3.1.7 | | — | |
| >TA based | | | | | | |
| >>TA List for QMC | | 1 ..<br><maxnoofTAforQMC> | | | | |
| >>>TAC | M | | 9.3.3.10 | The TAI is derived using the current serving PLMN. | — | |
| >TAI based | | | | | — | |
| >>TAI List for QMC | | 1 ..<br><maxnoofTAforQMC> | | | — | |
| >>>TAI | M | | 9.3.3.11 | | — | |
| >PLMN area based | | | | | | |
| >>PLMN List for QMC | | 1 ..<br><maxnoofPLMNforQMC> | | | | |
| >>>PLMN Identity | M | | 9.3.3.5 | | — | |
| Service Type | M | | ENUMERATED (QMC for streaming service, QMC for MTSI service, ...) | This IE indicates the service type of UE application layer measurements. | — | |

| Range bound | Explanation |
|---|---|
| maxnoofCellIDforQMC | Maximum no. of Cell ID subject for QMC scope. Value is 32. |
| maxnoofTAforQMC | Maximum no. of TA subject for QMC scope. Value is 8. |
| maxnoofPLMNforQMC | Maximum no. of PLMNs in the PLMN list for QMC scope. Value is 16. |
| maxnoofAdditionalQMC-1 | Maximum no. of Additional QMC measurements. Value is 7. |
| maxnoofMCE | Maximum no. of MCE. Value is 8. |

Where 9.x.x is Measurement Collection Entity Item. This information element indicates the Measurement Collection Entity.

| IE/Group Name | Presence | Range | IE type and reference | Semantics description | Criticality | Assigned Criticality |
|---|---|---|---|---|---|---|
| CHOICE MCE Address Type | | | | | YES | Reject |
| > Transport Layer Address | | | | | | |
| >> MCE IP Address | | | BIT STRING (1..160,...) | For details on the Transport Layer Address, see TS 36.424 [8], TS 36.414 [19] | | |
| > URL | | | | | | |
| >> MCE URL | | | OCTET STRING | The URL identifying the MCE. | | |

An example of implementation is provided below for XnAP (TS 38.423), where the bolded text relates to embodiments herein.

The following table, 9.2.3.55 Trace Activation, shows this IE which defines parameters related to a trace session activation.

| IE/Group Name | Pres-ence | Range | IE type and reference | Semantics description | Criti-cality | Assigned Criticality |
|---|---|---|---|---|---|---|
| NG-RAN Trace ID | M | | OCTET STRING (SIZE(8)) | This IE is composed of the following: Trace Reference defined in TS 32.422 [11] (leftmost 6 octets, with PLMN information encoded as in 9.3.3.1), and Trace Recording Session Reference defined in TS 32.422 [11] (last 2 octets). | — | |
| Interfaces to Trace | M | | BIT STRING (SIZE(8)) | Each position in the bitmap represents an NG-RAN node interface: first bit = NG-C, second bit = Xn-C, third bit = Uu, fourth bit = F1-C, fifth bit = E1: other bits reserved for future use. Value '1' indicates 'should be traced'. Value '0' indicates 'should not be traced'. | — | |
| Trace Depth | M | | ENUMERATED (minimum, medium, maximum, minimumWithoutVendorSpecificExtension, mediumWithoutVendorSpecificExtension, maximumWithoutVendorSpecificExtension, ...) | Defined in TS 32.422 [11]. | — | |
| Trace Collection Entity IP Address | M | | Transport Layer Address 9.3.2.4 | For File based Reporting. Defined in TS 32.422 [11]. This IE is ignored if the Trace Collection | — | |

-continued

|  |  |  | Entity URI IE is present. |  |  |
|---|---|---|---|---|---|
| MDT Configuration | O | 9.3.1.167 |  | YES | ignore |
| Trace Collection Entity URI | O | URI 9.3.2.14 | For Streaming based Reporting. Defined in TS 32.422 [11]. | YES | Ignore |
| UE application layer measurement configuration List |  | 0 .. \<maxnoofQMC\> |  | YES | Ignore |
| > UE application layer measurement configuration Item |  | 9.3.1.xxx |  | YES | Ignore |
| > Measurement Collection Entity List |  | 0 .. \<maxnoofMCE\> |  | YES | Ignore |
| >> Measurement Collection Entity |  | 9.x.x |  | YES | Ignore |

| Range bound | Explanation |
|---|---|
| maxnoofQMC | Maximum no. of QMC measurements. Value is 8. |

9.3.1.xxx UE Application layer measurement configuration. [25]
The IE defines configuration information for the QoE Measurement Collection (QMC) function.

| IE/Group Name | Presence | Range | IE type and reference | Semantics description | Criticality | Assigned Criticality |
|---|---|---|---|---|---|---|
| Container for application layer measurement configuration | M |  | Octet string (1..1000) | Indicates application layer measurement configuration. | — |  |
| CHOICE Area Scope of QMC | M |  |  |  | — |  |
| >Cell based |  |  |  |  |  |  |
| >>Cell ID List for QMC |  | 1 .. \<maxnoofCellIDforQMC\> |  |  |  |  |
| >>>NR CGI | M |  | 9.3.1.7 |  | — |  |
| >TA based |  |  |  |  |  |  |
| >>TA List for QMC |  | 1 .. \<maxnoofTAforQMC\> |  |  |  |  |
| >>>TAC | M |  | 9.3.3.10 | The TAI is derived using the current serving PLMN. | — |  |
| >TAI based |  |  |  |  | — |  |
| >>TAI List for QMC |  | 1 .. \<maxnoofTAforQMC\> |  |  | — |  |
| >>>TAI | M |  | 9.3.3.11 |  | — |  |
| >PLMN area based |  |  |  |  |  |  |
| >>PLMN List for QMC |  | 1 .. \<maxnoofPLMNforQMC\> |  |  |  |  |
| >>>PLMN Identity | M |  | 9.3.3.5 |  | — |  |
| Service Type | M |  | ENUMERATED (QMC for streaming service, QMC for MTSI service, ...) | This IE indicates the service type of UE application layer measurements. | — |  |

| Range bound | Explanation |
|---|---|
| maxnoofCellIDforQMC | Maximum no. of Cell ID subject for QMC scope. Value is 32. |
| maxnoofTAforQMC | Maximum no. of TA subject for QMC scope. Value is 8. |
| maxnoofPLMNforQMC | Maximum no. of PLMNs in the PLMN list for QMC scope. Value is 16. |
| maxnoofAdditionalQMC-1 | Maximum no. of Additional QMC measurements. Value is 7. |
| maxnoofMCE | Maximum no. of MCE. Value is 8. |

9.x.x Measurement Collection Entity.
This information element indicates the Measurement Collection Entity.

applied concurrently, or in parallel, with the current one. This may be the same indication as in the preceding option, although with a slightly different meaning depending on

| IE/Group Name | Presence | Range | IE type and reference | Semantics description | Criti-cality | Assigned Criticality |
|---|---|---|---|---|---|---|
| CHOICE MCE Address Type | | | | | YES | Reject |
| > Transport Layer Address | | | | | | |
| >> MCE IP Address | | | BIT STRING (1..160,...) | For details on the Transport Layer Address, see TS 36.424 [8], TS 36.414 [19] | | |
| > URL | | | | | | |
| >> MCE URL | | | OCTET STRING | The URL identifying the MCE. | | |

Embodiments Related to Independent Addition and Removal of QoE Measurement Configurations As previously described, the multiple QoE measurement configurations may be conveyed simultaneously to the RAN, e.g. from the OAM system, from the CN or from another RAN node. Alternatively, different QoE measurement configurations may be sent to the RAN sequentially, at different points in time. In this case, at each occasion when the RAN receives one or more QoE measurement configuration(s), this may be a single QoE measurement configuration or a set of QoE measurement configurations. Each time, the RAN may receive the QoE measurement configuration(s) from either an OAM node or a CN node, or another RAN node. When a QoE measurement configuration, or a set of QoE measurement configurations, is conveyed to the UE, it may comprise an indication of previously provided QoE measurement configuration(s) which the new QoE measurement configuration(s) may exist in parallel with i.e. in the same UE. In this way, multiple possibly concurrent or parallel QoE measurement configurations may be independently added or removed at different occasions. The indication of previously provided QoE measurement configuration(s) may have the form of QoE measurement ID(s) or QoE measurement configuration ID(s). As another option, a set of QoE measurement configurations that may be stored and applied e.g. concurrently may be given a common "QoE measurement configuration set ID" and then any new QoE measurement configuration to be added to the set may reference the set with the same QoE measurement configuration set ID.

As yet another option, a QoE measurement configuration provided to the RAN, e.g. provided subsequently to previously provided QoE measurement configuration(s), may have an associated indication of whether it may be combined with another, unspecified possibly concurrent/parallel QoE measurement configuration, in which case the RAN may forward the QoE measurement configuration to a UE which already has one or more QoE measurement configuration(s) and the UE would then store and potentially apply the new QoE measurement configuration.

As yet another option, a QoE measurement configuration may have an associated indication of whether subsequent QoE measurement configuration(s) may be stored and whether the concerned QoE measurement configuration is the first one provided to the UE or a subsequent one.

As yet another option, when a CN node provides a signaling based QoE measurement configuration to the RAN, indicating a specific UE the RAN should forward the QoE measurement configuration to, the CN node can also indicate whether this UE may have a previous or subsequent QoE measurement configuration stored and applied in parallel, e.g. whether the RAN node is allowed to forward the QoE measurement configuration to the UE even if the UE already has a QoE measurement configuration, in which case the QoE configurations may be stored and potentially applied in parallel. If the indication is that such concurrent QoE measurement configurations are not allowed for the UE, then, if the UE already has a QoE measurement configuration, this old measurement configuration may be deleted. Furthermore, if the indication from the CN node is that such concurrent QoE measurement configurations are not allowed for the UE, then, if the UE is provided with the concerned QoE measurement configuration and then another QoE measurement configuration is subsequently provided to the RAN from the CN or OAM, which potentially could be forwarded to the UE, then this subsequent QoE measurement configuration may not be forwarded to the UE although possibly the subsequent QoE measurement configuration can replace the old one in case it is a signaling based QoE measurement configuration which is indicated to override or have higher priority than the old one.

When a QoE measurement configuration is independently added to or removed from a set of QoE measurement configuration(s), in the RRC signaling between the RAN node and the UE, the information may be encoded using add-mod-list constructions, e.g. a QoE-MeasConfig-ToAddModList IE and/or a QoE-MeasConfigToRemoveList IE.

To perform the method in the first network node 311, the first network node 311 comprises modules as shown in FIG. 11. The network node 311 comprises a receiving module 1110, a transmitting module 1120, a determining module 1130, a processing module 1140, a memory 1150 etc.

The first network node 311 is configured to, by e.g. by means of the receiving module 1110 being configured to, receive from a second network node 312 an indication relating to application layer measurement configurations for one or more services for one or more UEs. The indication may be a list of application layer measurement configurations. The list of application layer measurement configurations may comprise a set of QoE measurement configurations for the same or different service types.

The list of application layer measurement configurations may further comprise one or more indications for one or more Measurement Collection Entities (MCEs), and/or Trace Collection Entities (TCEs) for receiving QoE measurement reports of the UE. The first network node 311 may send QoE measurement reports to corresponding MCEs and/or TCEs based on the configurations.

According to embodiments herein, the first network node 311 may further be configured to, e.g. by means of the transmitting module 1120 being configured to, send one or more application layer measurement configurations out of the list of application layer measurement configurations to one or more UEs.

The method according to embodiments herein may be implemented through one or more processors, such as the processor 1160 in the network node 311 together with computer program code for performing the functions and actions of the embodiments herein. The program code mentioned above may also be provided as a computer program product, for instance in the form of computer readable medium or a data carrier 1180 carrying computer program code 1170, as shown in FIG. 11, for performing the embodiments herein when being loaded into the network node 311. One such carrier may be in the form of a CD ROM disc. It is however feasible with other data carriers such as a memory stick. The computer program code may furthermore be provided as pure program code on a server or a cloud and downloaded to the network node 311.

To perform the method in the second network node 312, the second network node 312 comprises modules as shown in FIG. 12. The second network node 312 comprises a receiving module 1210, a transmitting module 1220, a determining module 1230, a processing module 1240, a memory 1250 etc.

The second network node 312 is configured to, e.g. by means of the transmitting module 1220 being configured to, transmit to a first network node 311 an indication relating to application layer measurement configurations for one or more services for one or more UEs. The indication may be a list of application layer measurement configurations.

The method according to embodiments herein may be implemented through one or more processors, such as the processor 1260 in the second network node 312 together with computer program code for performing the functions and actions of the embodiments herein. The program code mentioned above may also be provided as a computer program product, for instance in the form of computer readable medium or a data carrier 1280 carrying computer program code 1270, as shown in FIG. 12, for performing the embodiments herein when being loaded into the second network node 312. One such carrier may be in the form of a CD ROM disc. It is however feasible with other data carriers such as a memory stick. The computer program code may furthermore be provided as pure program code on a server or a cloud and downloaded to the second network node 312.

Figure 13:
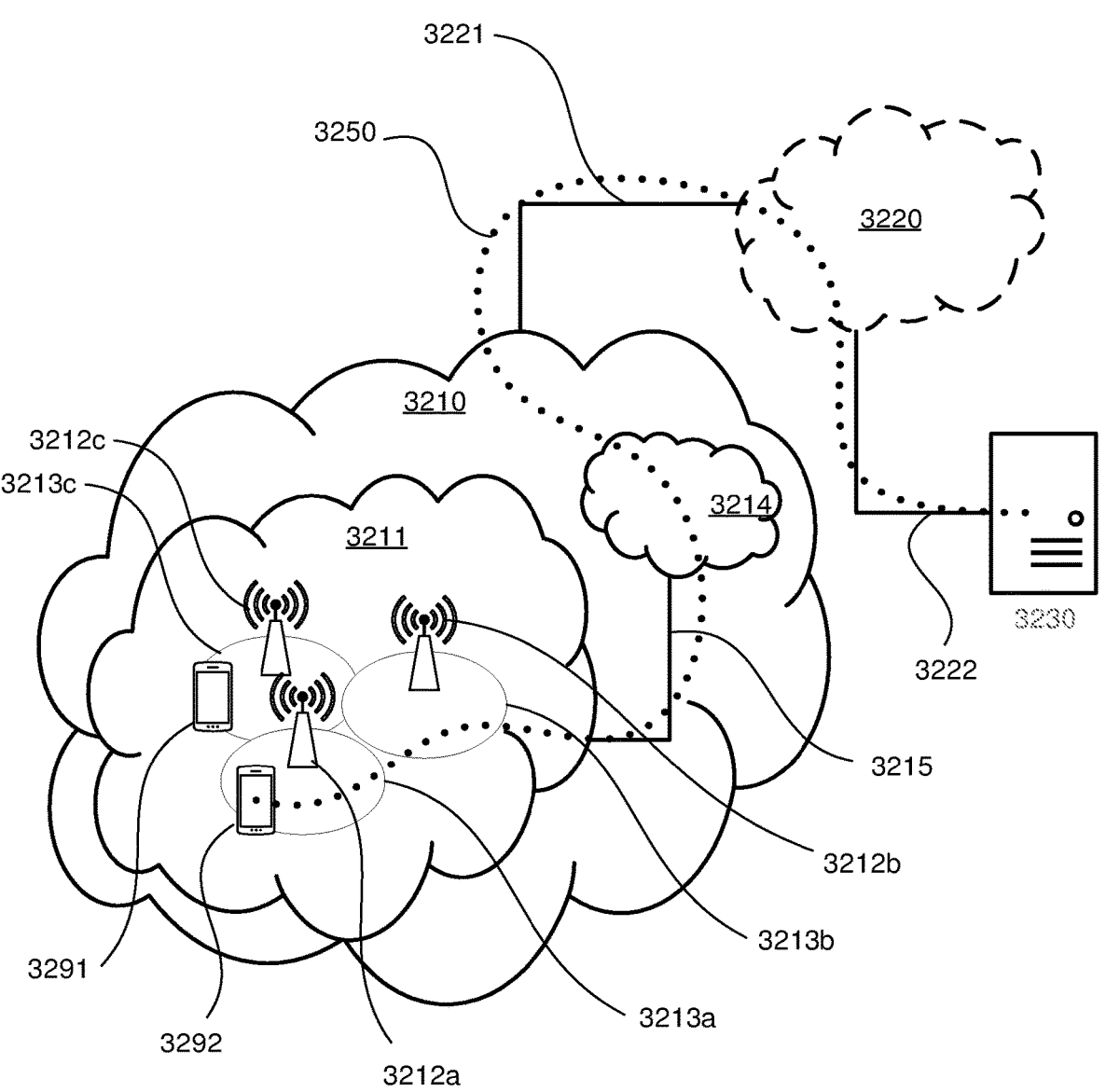
FIG. 13 schematically illustrates a telecommunication network connected via an intermediate network to a host computer.

With reference to FIG. 13, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 330, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
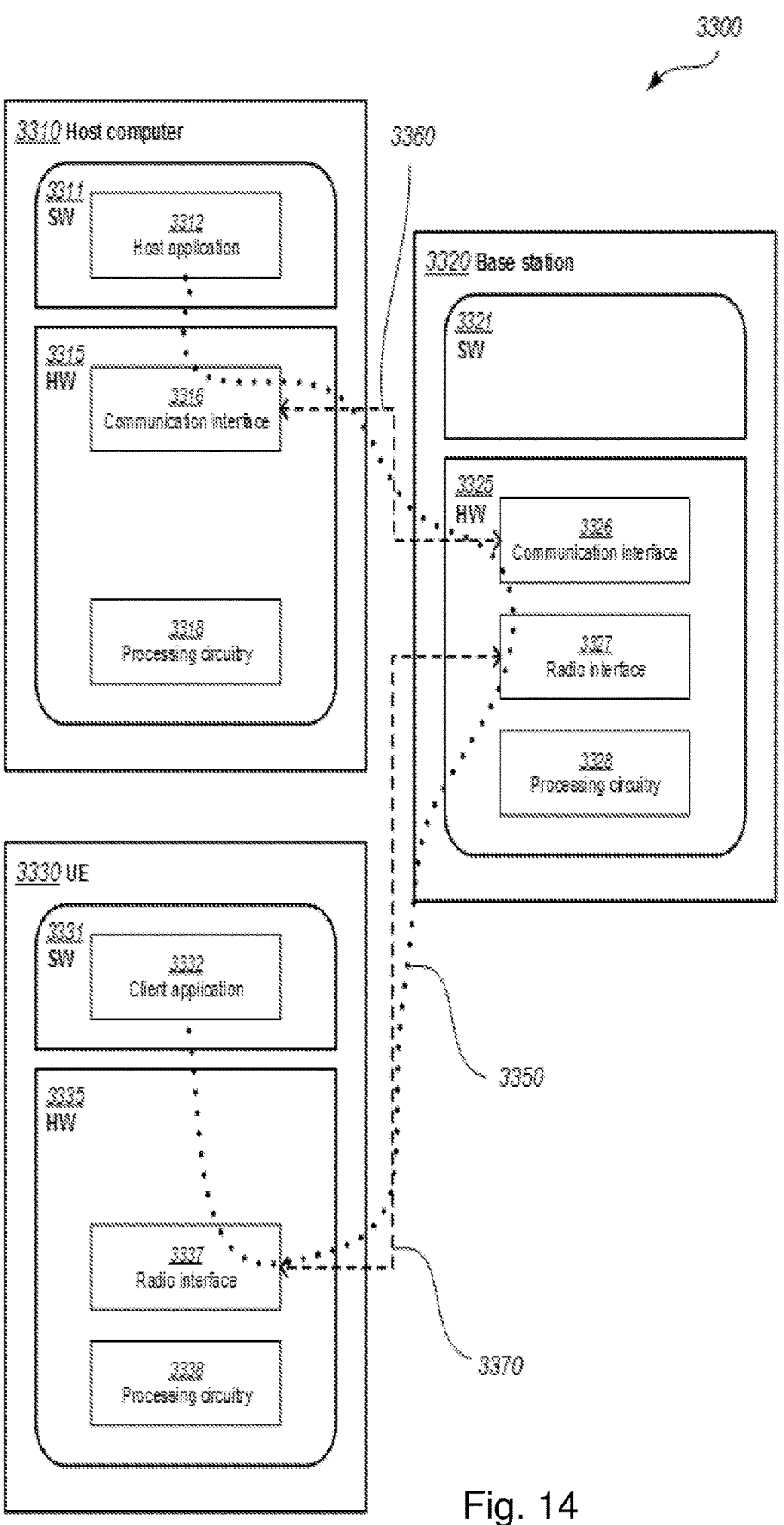
FIG. 14 is a generalized block diagram of a host computer communicating via a base station with a user equipment over a partially wireless connection.

It is noted that the host computer 3310, base station 3320 and UE 3330 illustrated in FIG. 14 may be identical to the host computer 3230, one of the base stations 3212*a*, 3212*b*, 3212*c* and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both.

Figures 15, 16:
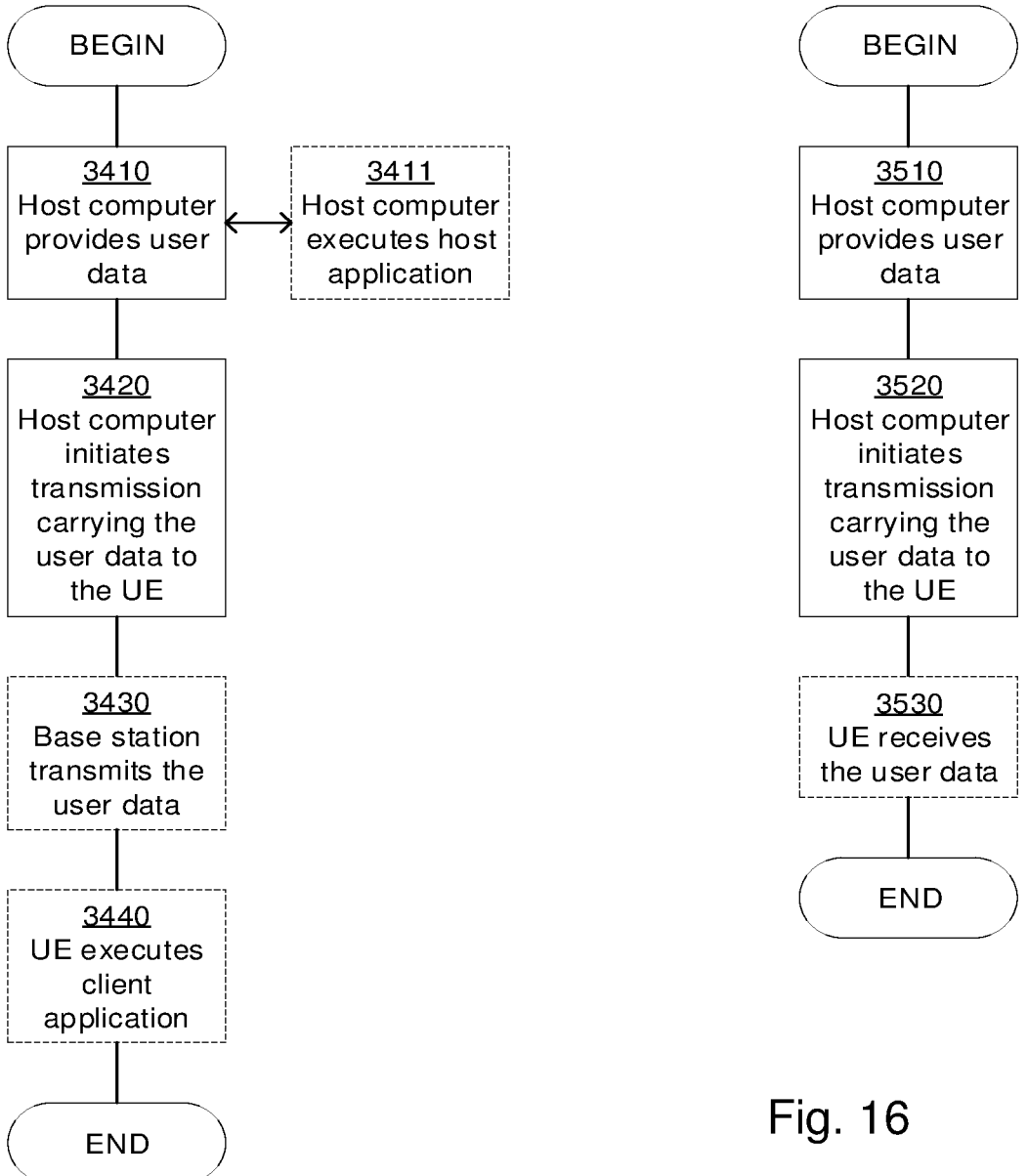
FIGS. 15-18 are flowcharts illustrating methods implemented in a communication system including a host computer, a base station and a user equipment.

It is noted that the host computer 3310, base station 3320 and UE 3330 illustrated in FIG. 15 may be identical to the host computer 3230, one of the base stations 3212*a*, 3212*b*, 3212*c* and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may achieve an efficient RACH process and thereby provide benefits such as improved battery time, and better responsiveness.

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may achieve an efficient QoE reporting and thereby provide benefits such as improved UE experience, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 17, 18:
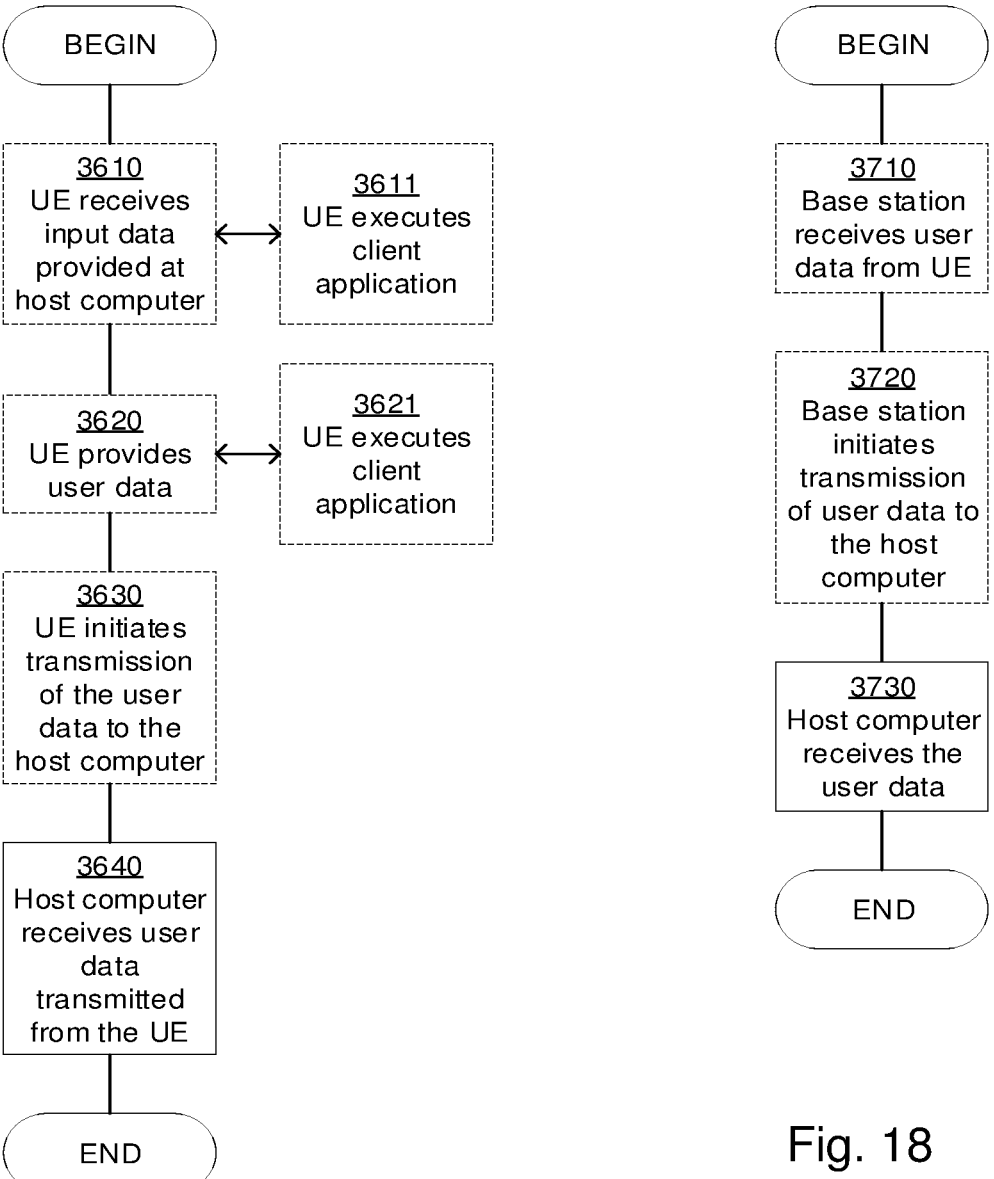

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), etc.

It will be appreciated that the foregoing description and the accompanying drawings represent non-limiting examples of the methods and apparatus taught herein. As such, the apparatus and techniques taught herein are not limited by the foregoing description and accompanying drawings.

The invention claimed is:

1. A method performed in a first network node for handling one or more services in a wireless communication network, the wireless communication network comprising the first network node, a second network node, and one or more wireless communication devices, the method comprising:

receiving from the second network node an indication relating to application layer measurement configurations for one or more services for one or more wireless communication devices;

determining a set of application layer measurement configurations for one or more wireless communication devices based on the received indication relating to application layer measurement configurations; and sending the determined set of application layer measurement configurations or an indication of the determined set of application layer measurement configurations to the one or more wireless communication devices.

2. The method according to claim 1, wherein the indication relating to application layer measurement configurations comprises a list of application layer measurement configurations.

3. The method according to claim 2, wherein the list of application layer measurement configurations comprises a list of Quality of Experience (QoE) measurement configurations for the same or different service types.

4. The method according to claim 3, wherein each QoE measurement configuration further comprises one or more of the following:

a container for application layer measurement configuration;

an identifier of the application layer measurement configuration;

an indication of an area scope;

one identifier indicating the service type of application layer measurements or a list of identifiers of service types;

one identifier or a list of identifiers of one of more specific wireless communication devices; and a priority indication to be used for prioritizing between the multiple QoE measurement configurations.

5. The method according to claim 3, wherein the list of application layer measurement configurations comprises one of both of:

one or more indications for one or more Measurement Collection Entities, MCEs; and Trace Collection Entities, TCEs, to which application layer measurement reports are to be sent, and the method further comprises:

sending application layer measurement reports received from one or more wireless communication devices to one of both of:

corresponding MCEs; and

TCEs based on the application layer measurement configurations.

6. The method according to claim 2, wherein the list of application layer measurement configurations comprises one of both of:

one or more indications for one or more Measurement Collection Entities, MCEs; and Trace Collection Entities, TCEs, to which application layer measurement reports are to be sent, and the method further comprises:

sending application layer measurement reports received from one or more wireless communication devices to one of both of:

corresponding MCEs; and

TCEs based on the application layer measurement configurations.

7. The method according to claim 2, wherein each application layer measurement configuration in the list of application layer measurement configurations includes an indication to indicate one or more of the following:

whether an application layer measurement configuration is a legacy QoE measurement configuration or a lightweight QoE measurement configuration;

whether an application layer measurement may be stored, applied or executed in parallel with a legacy QoE measurement configuration in a wireless communication device;

whether an application layer measurement may be stored, applied or executed in parallel with a lightweight QoE measurement configuration in a wireless communication device; and a type of the QoE measurements such as a signaling based QoE measurement, a management based QoE measurement or a combination of signaling and management based QoE measurement.

8. The method according to claim 1, wherein the first network node is a Radio Access Network, RAN, node, and the second network node is another RAN node, or a Core Network node, an Operation and Maintenance, OAM, node, a Service Management and Orchestration, SMO, node, and a Network Management System, NMS, node.

9. The method according to claim 1, wherein the first network node is a target Radio Access Network, RAN, node targeted by a mobility procedure, and the second network node is a source RAN node initiating the mobility procedure.

10. The method according to claim 1, wherein the first network node a target Radio Access Network, RAN, node needing to fetch contexts of one or more wireless communication devices, and the second network node is a source RAN node hosting the contexts of one or more wireless communication devices.

11. The method according to claim 1, wherein receiving from the second network node an indication relating to application layer measurement configurations for one or more services for one or more wireless communication devices comprising:

receiving from the second network node multiple application layer measurement configurations simultaneously.

12. The method according to claim 1, wherein receiving from the second network node an indication relating to application layer measurement configurations for one or more services for one or more wireless communication devices comprising:

receiving application layer measurement configurations sequentially at different points in time.

13. The method according to claim 12, wherein receiving application layer measurement configurations sequentially at different points in time comprises:

receiving at each time, a single QoE measurement configuration or a set of QoE measurement configurations.

14. The method according to claim 12, wherein receiving application layer measurement configurations sequentially at different points in time comprises:

receiving at each time, one or more measurement configuration(s) from either an OAM node or a CN node, or another RAN node.

15. The method according to claim 12, wherein sending an indication of the determined set of application layer measurement configurations to the one or more wireless communication devices comprises sending an indication of whether the previously provided application layer measurement configuration(s) exits with the current application layer measurement configuration(s) in parallel for the same wireless communication device.

16. The method according to claim 11, wherein an application layer measurement configuration comprises an associated indication of whether it is to be combined with another, unspecified concurrent or parallel QoE measurement configuration.

17. The method according to claim 12, wherein an application layer measurement configuration comprises an associated indication of whether subsequent application layer measurement configuration(s) is to be stored, combined or applied concurrently or in parallel with the current or another layer measurement configuration(s).

18. A first network node for handling one or more services in a wireless communication network, the wireless communication network comprising the first network node, a second network node, and one or more wireless communication devices, the first network node being configured to:

receive from the second network node an indication relating to application layer measurement configurations for one or more services for one or more wireless communication devices;

determine a set of application layer measurement configurations for one or more wireless communication devices based on the received indication relating to application layer measurement configurations; and send the determined set of application layer measurement configurations or an indication of the determined set of application layer measurement configurations to the one or more wireless communication devices.

19. A method performed by a second network node for handling one or more services in a wireless communication network, the wireless communication network comprising a first network node, the second network node, and one or more wireless communication devices, the method comprising:

transmitting to the first network node an indication relating to application layer measurement configurations for one or more services for one or more wireless communication devices, the indication comprising a list of application layer measurement configurations.

20. A second network node for handling one or more services in a wireless communication network, the wireless communication network comprising a first network node, the second network node, and one or more wireless communication devices, the second network node is configured to:

transmit to the first network node an indication relating to application layer measurement configurations for one or more services for one or more wireless communication devices, the indication comprising a list of application layer measurement configurations.

\* \* \* \* \*